United States Patent
Lai et al.

(10) Patent No.: US 8,291,381 B2
(45) Date of Patent: Oct. 16, 2012

(54) CALL STACK PARSING IN MULTIPLE RUNTIME ENVIRONMENTS

(75) Inventors: Thomas Lai, Bellevue, WA (US); Mike Stall, Bothell, WA (US); Jon Langdon, Issaquah, WA (US); Jan Stranik, Bellevue, WA (US); Drew Bliss, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1419 days.

(21) Appl. No.: 11/904,387

(22) Filed: Sep. 27, 2007

(65) Prior Publication Data
US 2009/0089764 A1 Apr. 2, 2009

(51) Int. Cl.
*G06F 9/44* (2006.01)
(52) U.S. Cl. .................... 717/124; 717/126; 717/130
(58) Field of Classification Search .................... None
See application file for complete search history.

(56) References Cited

U.S. PATENT DOCUMENTS

| | | | |
|---|---|---|---|
| 6,009,258 A | 12/1999 | Elliott | |
| 6,293,712 B1 | 9/2001 | Coutant | |
| 6,513,155 B1 | 1/2003 | Alexander, III et al. | |
| 6,662,358 B1 | 12/2003 | Berry et al. | |
| 6,857,120 B1 | 2/2005 | Arnold et al. | |
| 6,892,379 B2 | 5/2005 | Huang | |
| 6,904,594 B1 * | 6/2005 | Berry et al. | 717/130 |
| 6,934,939 B2 | 8/2005 | Ewart et al. | |
| 7,178,132 B2 | 2/2007 | Pierce | |
| 7,401,323 B2 * | 7/2008 | Stall et al. | 717/124 |
| 7,478,366 B2 * | 1/2009 | Bickson et al. | 717/124 |
| 7,743,423 B2 * | 6/2010 | Lange et al. | 717/126 |
| 8,024,710 B2 * | 9/2011 | Kornstaedt | 717/124 |
| 2003/0204838 A1 * | 10/2003 | Caspole et al. | 717/130 |
| 2004/0128658 A1 | 7/2004 | Lueh et al. | |
| 2005/0273757 A1 | 12/2005 | Anderson | |
| 2006/0212844 A1 | 9/2006 | Goldin et al. | |
| 2007/0089088 A1 | 4/2007 | Borde et al. | |
| 2008/0209406 A1 * | 8/2008 | O'Callahan | 717/131 |
| 2008/0270990 A1 * | 10/2008 | Kornstaedt | 717/126 |

OTHER PUBLICATIONS

Cierniak et al., "The Open Runtime Platform: a flexible high-performance managed runtime environment", Feb. 22, 2005, Wiley InterScience, pp. 617-637, <http:www.interscience.wiley.com>.*
Cierniak et al., "Open Runtime Platform: Flexibility with Performance using Interfaces", 2002 ACM, JGI'02, pp. 156-164 <http://dl.acm.org/results.cfm?h=1&cfid=106675207&cftoken=55507072>.*
Anthony Savidis, "Supporting Cross-Language Exception Handling When Extending Application with Embedded Languages", 2011 Springer-Verlag Heidelberg, LNCS 6968, pp. 93-99 <http://www.springerlink.com/content/d73406021583k45I/>.*

(Continued)

*Primary Examiner* — Thuy Dao
*Assistant Examiner* — Ben Wang
(74) *Attorney, Agent, or Firm* — Microsoft Corporation

(57) ABSTRACT

Where a process in a computing system comprises mixed code, having different sections of code managed by different runtimes, the call stack used to coordinate function invocations may comprise call stack frames created according to multiple calling conventions. In order to analyze this call stack in a stack walk or unwinding, a debugger may be configured to request the runtimes managing the process to claim a particular call stack frame, and to request the runtime that claims it to parse the contents of the frame, or to utilize call stack analysis techniques if the call stack frame was created by unmanaged code.

19 Claims, 12 Drawing Sheets

OTHER PUBLICATIONS

Lee et al., "Debug All Your Code: Portable Mixed-Environment Debugging", 2009 ACM, Oct. 25-29, 2009, OOPSLA'09, pp. 1-19 <http://dl.acm.org/results.cfm?h=1&cfid=106675207&cftoken=55507072>.*

Bernet, et al., "Incremental Call-Path Profiling", pp. 1-9.

Froyd, et al., "A Sample-Driven Call Stack Profiler", Date: Jul. 15, 2004, pp. 1-15.

Fruja, et at, "Analysis of the .NET CLR Exception Handling Mechanism", Date: 2005, pp. 1-11.

"International Search Report", Filed date Aug. 26, 2008, Application No. PCT/US2008/077947, pp. 1-11. (MS#321264.02).

* cited by examiner

40

Runtime A Call Stack Frame — 42

| Address | Contents |
|---|---|
| | --- top of call stack --- |
| 0x1000E0CC | 32-Bit Address of Return Object Buffer (0x1000B030) |
| 0x1000E0D0 | 32-Bit Return Address (0x1000A018) |
| 0x1000E0D4 | 32-Bit Address of Parameter #2: myObject (0x1000B010) |
| 0x1000E0D8 | 32-Bit Value of Parameter #1 (12), Big Endian |
| 0x1000E100 | Ten 32-Bit CPU Registers |
| | --- previous call stack frames --- |

— 52
— 50
— 48
— 46
— 44

Runtime B Call Stack Frame — 54

| Address | Contents |
|---|---|
| | --- top of call stack --- |
| 0x1000E0CC | 32-Bit Address of Return Object Buffer (0x1000B030) |
| 0x1000E0D0 | 32-Bit Value of Parameter #1 (12), Little Endian |
| 0x1000E0D4 | 32-Bit Address of Parameter #2: myObject (0x1000B010) |
| 0x1000E0D8 | 32-Bit Return Address (0x1000A018) |
| 0x1000E100 | Ten 32-Bit CPU Registers |
| | --- previous call stack frames --- |

— 64
— 62
— 60
— 58
— 56

Runtime C Call Stack Frame — 66

| Address | Contents |
|---|---|
| | --- top of call stack --- |
| 0x1000E068 | 64-Bit Address of Return Object Buffer (0x000000001000B030) |
| 0x1000E070 | 64-Bit Return Address (0x000000001000A018) |
| 0x1000E078 | 64-Bit Address of Parameter #2: myObject (0x000000001000B010) |
| 0x1000E080 | 64-Bit Value of Parameter #1 (12), Big Endian |
| 0x1000E100 | Sixteen 64-Bit CPU Registers |
| | --- previous call stack frames --- |

— 76
— 74
— 72
— 70
— 68

Native Code Call Stack Frame — 78

| Address | Contents |
|---|---|
| | --- top of call stack --- |
| 0x1000E0B4 | 32-Bit Return Address (0x1000A018) |
| 0x1000E0B8 | 32-Bit Address of Return Object Buffer (0x1000B030) |
| 0x1000E0BC | 32-Bit Address of Parameter #2: myObject (0x1000B010) |
| 0x1000E0C0 | 32-Bit Value of Parameter #1 (12), Little Endian |
| 0x1000E100 | Sixteen 32-Bit CPU Registers |
| | --- previous call stack frames --- |

CALL STACK PARSING IN MULTIPLE RUNTIME ENVIRONMENTS

BACKGROUND

The procedural programming paradigm often involves the invocation of one procedure (more commonly known as a function or method) from within another. Each invocation involves the storage of a set of information. The state of the processor (e.g., the data within the CPU registers) is stored so that the processor can be returned to this state upon completion of the invoked function. The parameters passed into the invoked function (e.g., the values of simple types such as integers and characters, and the memory addresses of larger structures, such as class instances) are stored in a predetermined order, and then loaded by the invoked function. Also stored are the memory address of the instruction to which the processor returns upon completion of the invoked function and, in some circumstances, the address of a memory buffer allocated to hold a variable or object returned by the invoked function. These data items are stored in a manner that provides precise and predictable accessibility to both the invoking and the invoked functions. This may be difficult because the invoked function may invoke others, and the nesting of invoked functions may reach many levels of depth, especially in the case of recursion, where a function invokes itself (possibly hundreds or thousands of times.)

Accordingly, procedurally oriented code often stores this information on a call stack, a designated portion of memory that holds the data exchanged between each invoking function and each invoked function. A computing environment may utilize such a call stack for storing data between such function invocations, and some such systems utilize a plurality of call stacks simultaneously for various purposes (e.g., for storing different kinds of data, and/or for storing call stack data between different processes.) Upon a function invocation, the operating environment creates a call stack frame (also known as an activation record) on the call stack, comprising the set of information described above stored in a predetermined manner and order, on the "top" of the call stack. Eventually the "called" function terminates, and processing control is returned to the invoking function, while the call stack frame is removed from the call stack. In turn, the invoked function may invoke other functions, resulting in the allocation of call stack frames "above" the call stack frame of the invoked function that are removed upon termination of the functions invoked by the invoked function. Hence, the call stack operates as a "last-in, first-out" data structure, wherein the first call stack frame "pushed" onto the call stack is the last one "popped" off of the call stack, and the second call stack frame "pushed" onto the call stack (on "top" of the first call stack frame) is removed from the call stack before the first one can be removed, etc. The computer system component that manages access to the call stack (e.g., the memory allocation in execution of the "pushing" and "popping" operations) also tracks the "top" of the call stack, i.e., the memory address of free space that may be used for the next "pushed" data. This memory address is tracked by storing it in a stack pointer, which may be (e.g.) a register, a data object stored elsewhere in system memory, etc.

Several scenarios may benefit from an analysis of the contents of the call stack. As one example, debugging a procedurally programmed application may involve suspending execution upon reaching specific instruction and examining the call stack to determine the order in which functions were called, and to detect how a particular instruction was reached. The analysis may yield information on the chronology of nested function invocations and the details thereof, such as: "Function A invoked Function B, while passing in parameters object1 and object2; Function B then invoked Function C; Function C then performed recursion with a second invocation of Function C . . . ." This analysis of the call stack, sometimes called a "stack walk" or "stack unwinding," may involve parsing the contents of a call stack frame, and the results may be reported to the administrator or programmer, e.g., in a debugger application. In the case of call stack debugging, a virtual unwinding is conventionally performed, wherein the call stack is not altered, but where its contents are analyzed on a per-frame basis as if the calls tack frames were popped from the stack in the usual manner.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure pertains to the analysis of a call stack in a computer system that is accessible to at least one runtime. Because the call stack may be used differently among various runtimes, and may be used in almost any manner by native code, the call stack may contain a variety of call stack frames created according to different calling conventions. This variance may create difficulties in determining the contents of the call stack, and even in identifying each call stack frame, since the call stack may simply contain binary data without indications of call stack frame sizes or divisions.

Call stack analysis techniques are presented herein that may circumvent some or all of these problems in analyzing a call stack frame. These techniques involve consulting with each runtime to which the call stack is accessible and requesting it to claim ownership of the call frame (i.e., to assert that the runtime was responsible for creating the call stack frame.) If any runtime claims ownership of the call stack frame, then the computer system analyzes the call stack frame using the claiming runtime (e.g., according to the calling conventions of the runtime.) If no runtime claims ownership of the call stack frame, then the computer system presumes that the call stack frame was created by native code, which might not adhere to any call stack calling convention. The computer system may therefore utilize a native code call stack frame analyzer, which attempts to parse the contents of the call stack based on some other techniques. As one example, the native code call stack frame analyzer might examine the symbol table to match the contents of the call stack with the types of objects that have been allocated. As another example, the native code call stack frame analyzer might employ heuristics to determine the contents of the call stack, e.g., by differentiating data structures in the call stack frame that more closely resemble memory addresses vs. data structures that more closely resemble primitive value types. In this manner, the computer system may utilize a native code call stack frame analyzer to determine the contents of a call stack frame in the event that no runtime claims ownership of the call stack frame. This analysis may be repeated on the call stack until no call stack frames remain. Some variations of this technique are also discussed that may present various advantages and/or avoid various disadvantages.

To the accomplishment of the foregoing and related ends, the following description and annexed drawings set forth certain illustrative aspects and implementations. These are indicative of but a few of the various ways in which one or

DESCRIPTION OF THE DRAWINGS

FIG. 1B is a set of illustrations of call stacks created by various runtimes with respect to the memory of FIG. 1A.

DETAILED DESCRIPTION

Figure 1A:
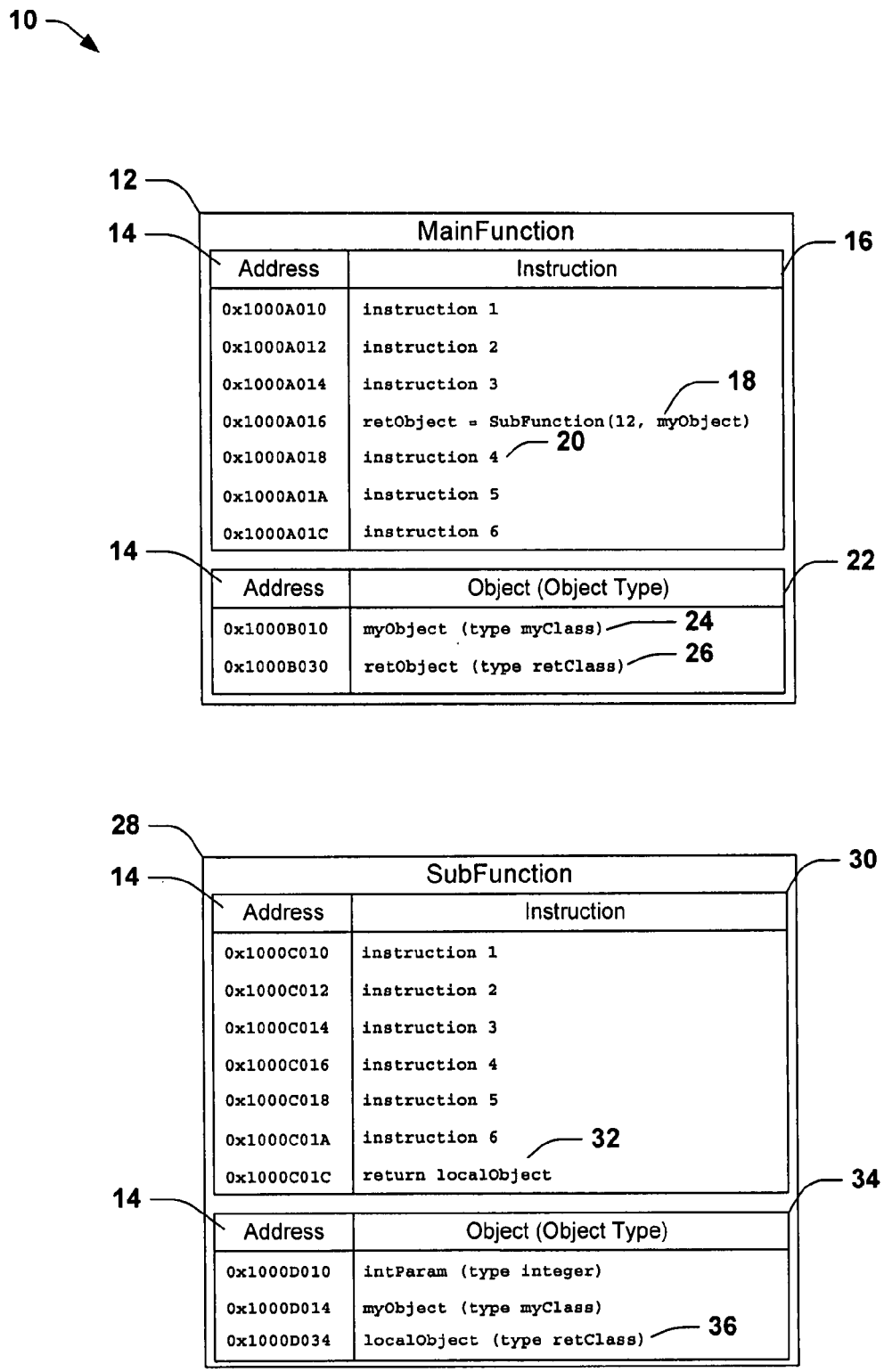
FIG. 1A is an illustration of a computer memory containing two functions.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As noted hereinabove, this disclosure pertains to the representation of a call stack in a computer system, where the call stack is used to store information needed in procedurally programmed code when one function (an invoking function) invokes another function (an invoked function.) This information often comprises, e.g., the state and contents of various CPU registers at the moment of invocation, the parameters provided by the invoking function to the invoked function, the address of a memory buffer for storing an object or value returned by the invoked function, and the address of the next instruction in the invoking function that the CPU executes upon completing the invoked function. These pieces of information are stored on the call stack in a grouped structure called a call stack frame. The call stack frame for handling a function invocation may comprise these and other forms of data, which may be stored in various formats (e.g., big Endian vs. little Endian format for multi-byte numeric data) and orders (e.g., the parameters may be stored in the order provided—the first parameter stored first, followed by the second parameter, etc. —or in reverse order—the last parameter stored first, followed by the second-last parameter, etc.) The types, formats, and orderings of data stored in the call stack frame are collectively known as a calling convention.

This disclosure also pertains to a call stack that is accessible to a variety of runtimes. A runtime is a process facilitator that manages the working context for the process, often to the extent of creating and managing a sophisticated virtual machine in which the process executes. The management functions of runtimes often include interfacing with the call stack on behalf of the process, including the creation of call stack frames for newly invoked functions within the process and the removal of call stack frames for completed functions within the process. The runtime may also support call stack analysis tasks by providing parsing for the call stack frames that it creates. The various runtimes may service different kinds of code that have been compiled into machine-executable instructions (e.g., a C# managed code runtime to support code that has been compiled from C#, and a Java™ runtime to support code that has been compiled from Java™.) However, not all processes involve runtimes; code may also execute natively on a processor without the assistance of a runtime ("native code"), and the operating environment may provide a native code call stack frame analyzer for parsing call stack frames created for a process by native code. For example, the native code call stack frame analyzer may be included with the operating system, or with a language framework or runtime installed in the operating environment, or as a standalone component; alternatively, the native code call stack frame analyzer may be included with implementations of these techniques.

The various runtimes and native code may use the call stack in different ways, i.e., according to different calling conventions. For example, C# compiled code may be managed by a C# managed code runtime that applies one calling convention, whereas code compiled from Java™ may be facilitated by a Java™ runtime that applies a different calling convention, and code compiled from a C language compiler may be managed by a C language runtime that applies one of several calling conventions (e.g., _cdecl, _stdcall, or _fastcall.) As a specific example, code compiled from the Pascal programming language ordinarily applied a calling convention wherein the parameters were pushed onto the call stack in forward order (i.e., left-to-right) with respect to the invoked function declaration, whereas code compiled from the C programming language ordinarily applied a calling convention wherein the parameters were pushed onto the stack in reverse order (i.e., right-to-left) with respect to the invoked function declaration. These usage discrepancies may render the contents of the call stack less predictable, and it may be difficult to examine a call stack frame on a call stack without knowing which runtime created the call stack frame, or if the call stack frame was created according to the calling conventions of native code.

FIGS. 1A-1B illustrate some variations in the call stack conventions of various runtimes, and together illustrate the problems that may arise from using a call stack according to different calling conventions. The runtimes and call stack usages presented in FIGS. 1A-1B are hypothetical, but the difficulties that this example illustrates are of practical concern. It will also be appreciated that many details of the operation and components of the computer system are presented in a simplified manner for the sake of focusing on the hypothetical call stack usage described herein.

FIG. 1A illustrates two portions of a computer memory 10, where various bytes in the memory 10 are assigned hexadecimal addresses 14. The computer memory 10 of FIG. 1 represents the volatile, random-access, working memory of the computer system, such as the level 2 cache or system RAM. The first portion 12 of the computer memory 10 comprises a function loaded into memory called "Main Function," comprising a set of computer-executable instructions 16 (e.g., machine language for a computer architecture, Java™ bytecode for a Java™ virtual machine, etc.) and a memory space 22 for a set of objects that are utilized in the function 12. The computer-executable instructions 16 comprising "MainFunction" 12 include an instruction 18 that invokes another function, SubFunction. This function invocation 18 passes into the invoked function two parameters—an integer with the value of 12 (which is passed by value, i.e., where the value of the integer is provided to the invoked function) and an object called myObject 24 of type myClass that is stored in the first memory object space 22 (which is passed by reference, i.e., where the address of the object is provided to the invoked function.) The function invocation 18 also anticipates that the invoked function will return an object of type retClass, and instructs that the returned object is to be stored in the object memory space 22 with the name retObject 26.

FIG. 1A also illustrates a second portion 28 of the computer memory 10 comprising a second function loaded into memory called "SubFunction," which is the function invoked by "MainFunction." "SubFunction" also comprises a set of computer-executable instructions 30 and a memory space 34 for a set of objects utilized in the function 28. "SubFunction" performs some instructions (e.g., some mathematical transformations and/or memory operations involving the parameters provided to the function, which are illustrated as having been stored in the object space 34) and ends with a return instruction 32 that returns program execution to the invoking function 12. The return instruction 32 also supplies an object of type retClass called localObject 36, which is provided back to the invoking function 12 (e.g., by filling the memory address buffer that the invoking function has allocated for the return object—in this example, the retObject object 26 in the memory object space 22 of the "MainFunction" function 12. Such objects may be exchanged among functions by storing the data representation of the objects in whole or in part on the call stack. Alternatively or additionally, such objects may be exchanged by storing the data representation in whole or in part elsewhere in memory, e.g., on a shared heap space, and the memory addresses may reference these other portions of memory. The latter arrangement may be advantageous, since other areas of memory (such as the heap space) may be more persistent than the call stack between function invocations, and may therefore present fewer problems with persisting such objects in memory after such functions terminate.

The invocation of the "SubFunction" function by the "MainFunction" function illustrated in FIG. 1A involves the storage and exchange of information. The CPU and/or operating system store(s) the state and values of some or all of its registers at the moment of invocation, and these register states and values are restored once the invoked function completes. The CPU and/or operating system also store(s) the return address, which is the memory address of the instruction that the CPU next executes once the invoked function completes. In this example, the return address is the address of the instruction following the invoking instruction 18, which is "instruction 4" 20, having an address of 0x1000A018. The CPU and/or operating system also store(s) the value of each parameter passed by value, such as the integer "12" passed as the first parameter, and the address of every parameter passed by reference, such as the myObject object 24 at memory address 0x1000B010. Finally, the CPU and/or operating system also store(s) the address of a memory buffer allocated for a return object from the invoked function—in this case, the memory buffer for the retObject object 26 at memory address 0x1000B030.

As noted herein, discrepancies in the calling conventions utilized by various runtimes and native code may cause variations in the call stack frames placed on the call stack. This circumstance is depicted in FIG. 1B, which illustrates the call stack frames that may be formed by various (hypothetical) runtimes in accordance with the function invocation illustrated in FIG. 1A. In this example, each call stack frame is illustrated as a portion of hexadecimally addressed memory comprising a portion of a call stack, where the previous call stack frames (i.e., the call stack frames for preceding function invocations, such as the function invocations that led to the function that is triggering the function invocation corresponding to the illustrated call stack frame) may be stored below (i.e., in higher-numbered memory addresses) than the call stack frame. Each exemplary call stack frame is also illustrated as the top call stack frame in the call stack, whereby the memory above (i.e., in lower-numbered memory addresses) the call stack frame is empty and can be filled with additional call stack frames. It will be appreciated that this is but one possible configuration among many configurations of a call stack; e.g., in contrast with this "upward-growing" call stack, other call stacks may be configured to grow "downward," such that subsequent call stack frames are stored in higher-numbered memory addresses than preceding call stack frames.

The exemplary call stack frames in FIG. 1B, each of which corresponds to the exemplary function invocation of FIG. 1A, illustrate the variations in the contents of the call stack frame that may arise due to various calling conventions. This example 40 relates to an upward-growing call stack, where data pushed onto the call stack has a higher-numbered memory address than data pushed subsequently onto the call stack. In this example 40, four call stack frames are illustrated: one each created by a hypothetical "Runtime A," "Runtime B," and "Runtime C," and one created by native code. Each runtime and the native code are configured to create call stack frames according to a different calling convention, such that the contents of the call stack frame differ for each runtime and the native code, even though the call stack frames represent the function invocation illustrated in FIG. 1A. For example, in the call stack frame 42 created by Runtime A comprises (in order from first, at the highest-numbered memory address, to last, at the lowest-numbered memory address) the contents of ten 32-bit CPU registers 44, the first function parameter 46 and the second function parameter 48 (pushed onto the call stack in the forward order specified by the invoked function), the return address 50, and the memory address of the return object buffer 52, which is filled with the memory address of the returned object upon completion of the invoked function. This calling convention may be designed in order to provide some code optimization advantages that improve the speed and resource economy of the runtime. For example, while the machine on which this hypothetical runtime is operating may have sixteen CPU registers, the invoked function might only utilize the ten most commonly used CPU registers, so the calling convention may only specify storing the states of these ten CPU registers in the call stack frame. As a result, the call stack frame 42 created in this calling convention consumes a scant 56 bytes of the call stack.

By contrast, the call stack frame 54 created by Runtime B comprises different data items. While the call stack frame 54 for Runtime B presents the same call stack frame size (56 bytes), and places the CPU registers 56 and the address of the return object buffer 64 in the same locations as in the call stack frame 42 for Runtime A. However, three notable differences exist: the return address 58 is pushed onto the call stack before the parameters 60, 62; the parameters 60, 62 are pushed in the reverse order specified by the invoked function (i.e., from last to first); and the integer value representing the first parameter 62 is stored in little Endian format, which differs from the big Endian formatting of the first parameter 46 in the call stack frame 42 of Runtime A.

Even greater discrepancies are present in the call stack frame 66 created by Runtime C and in the call stack frame 78 created by native code. Runtime C comprises a 64-bit runtime, and the call stack frame 66 for Runtime C stores the first parameter 70 as a 64-bit integer; 64-bit memory addresses for the return address 74, the second parameter 72, and the return object buffer 76; and 64-bit values for a full complement of sixteen CPU registers 68. Thus, while the data item ordering and Endian numeric representation in this call stack frame 66 for Runtime C are the same as in the call stack frame 42 of Runtime A, the values stored therein may considerably differ, and even the stack frame size may be larger (160 bytes for the Runtime C call stack frame 66, vs. only 56 bytes for the Runtime A call stack frame 42.) Still other differences are apparent in the call stack frame 78 for native code, which stores the return address 88 last in the stack (after the function parameters 82, 84 and the memory address for the return object buffer 86), and which stores the values of a full complement of sixteen 32-bit CPU registers 80. The resulting call stack frame 78 consumes 80 bytes of the call stack. As a result of these calling convention details, the call stack frame 78 created by native code differs significantly from the call stack frames 42, 54, 66 created by each of the runtimes.

The scenario illustrated in FIG. 1B presents a complication to the task of call stack analysis, such as a debugger that elucidates the order and details of function calls leading up to the execution of a particular instruction in a process. Programmers may find this information useful in tracing the procedural flow of a process while addressing software errors and considering code optimizations. However, because the data on the call stack is not ordinarily annotated (e.g., the breaks between call stack frames are not recorded), the call stack may appear as a monolithic set of binary data with no semantic connotations, which may preclude call stack analysis. Nevertheless, if the call stack is being utilized exclusively according to a single calling convention, the debugger may presume that each portion of memory stored on the call stack comprises data items ordered and formatted accordingly. For example, if a running process is exclusively managed by Runtime A, then the call stack will likely comprise a series of stacked 56-byte call stack frames structured in the same manner as the call stack frame 42 in FIG. 1B.

However, in some programming environments, usage of a call stack for a process exclusively by a single calling convention cannot be presumed. As one example, a process may procedurally invoke sections of code that are interoperable, but that were created from different types of source code. For example, a function written in and compiled from C# may invoke a function written in and compiled from the C language, which may invoke a function provided by the operating system and originally written in native code (e.g., assembly.) These three sections of code may be facilitated, respectively, by a C# managed code runtime, a C language runtime, and no runtime of any kind; and the C# managed code runtime, the C language runtime, and the native code may utilize different calling conventions while accessing the call stack for the running process. As a result, analyzing the call stack for debugging or other purposes may be difficult.

Some techniques may be available for facilitating the analysis of a mixed-calling-convention call stack. One such technique pertains to the configuration of the runtimes, which interact with the call stack while creating and disposing of call stack frames. If a runtime can keep track of the call stack frames that it creates, it may later be able to assist in the call stack analysis, e.g., by claiming ownership of the call stack frames that it has created according to its calling conventions. When a program (such as, e.g., the operating system, or a debugger operating as part of a development environment) is directed to analyze a call stack frame on a call stack for a process, the call stack analyzing program may consult the runtimes to request them to claim ownership of the call stack frame. If any of the runtimes claims ownership of the call stack frame, the call stack analyzing program may parse the call stack frame according to the calling convention of the runtime that has claimed the call stack frame. On the other hand, if no runtime claims the call stack frame, the call stack analyzing program may presume that the call stack frame was created by native code, and may resort to the native code calling conventions in parsing the contents of the call stack frame.

Figure 2:
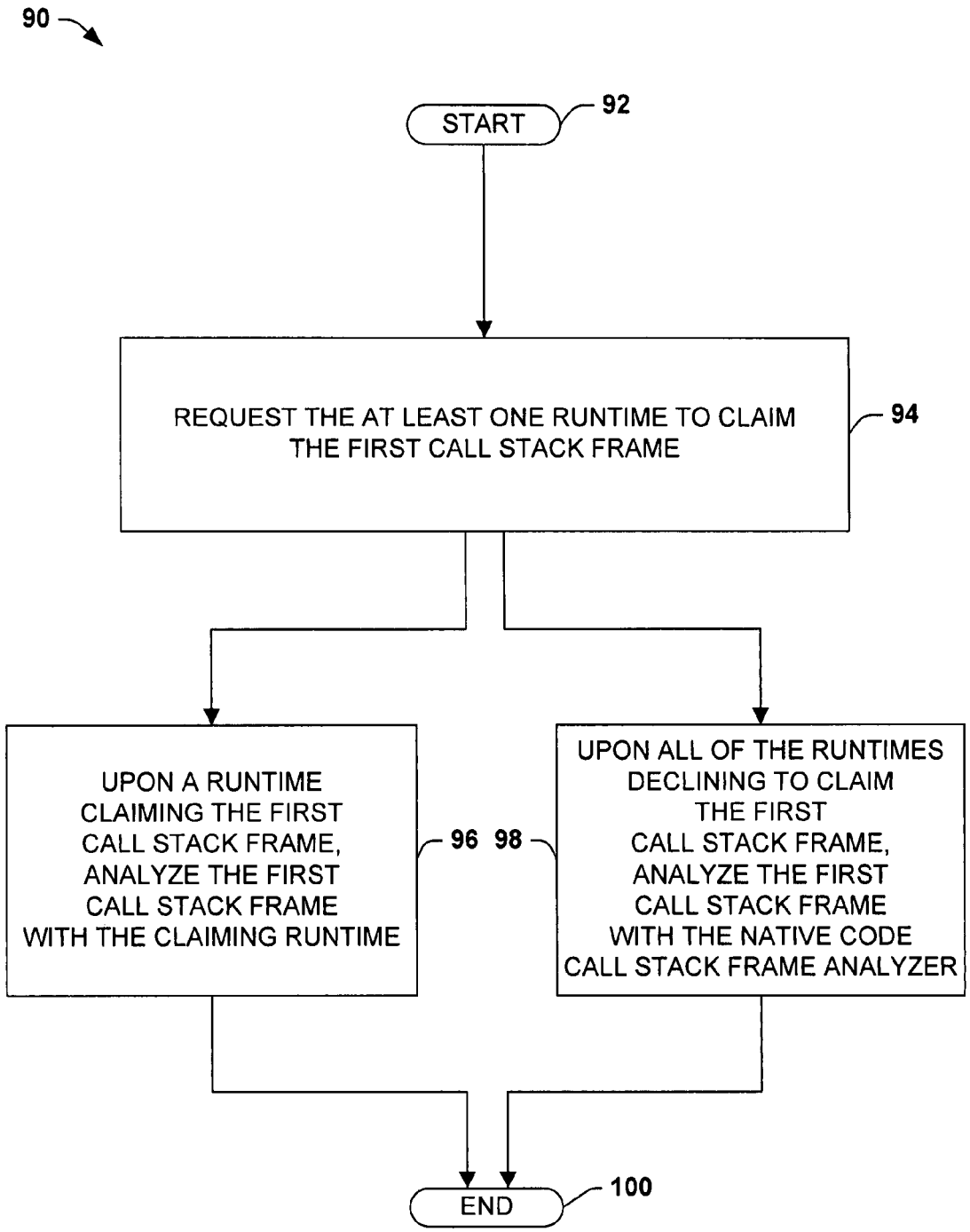
FIG. 2 is a flowchart illustrating an exemplary method of analyzing a call stack.

FIG. 2 illustrates one embodiment of this technique. This exemplary embodiment comprises a method 90 of analyzing a call stack available to at least one runtime and comprising a first call stack frame. The method 90 begins at 92 and involves requesting the at least one runtime to claim the first call stack frame 94. Upon a runtime claiming the first call stack frame, the method 90 involves analyzing the first call stack frame with the claiming runtime 96; while upon all of the runtimes declining to claim the first call stack frame, the method 90 involves analyzing the first call stack frame with a native code call stack frame analyzer 98. Having performed one of an analysis with a runtime 96 and an analysis with the native code call stack frame analyzer 98, the method 90 ends at 100.

Figure 3:
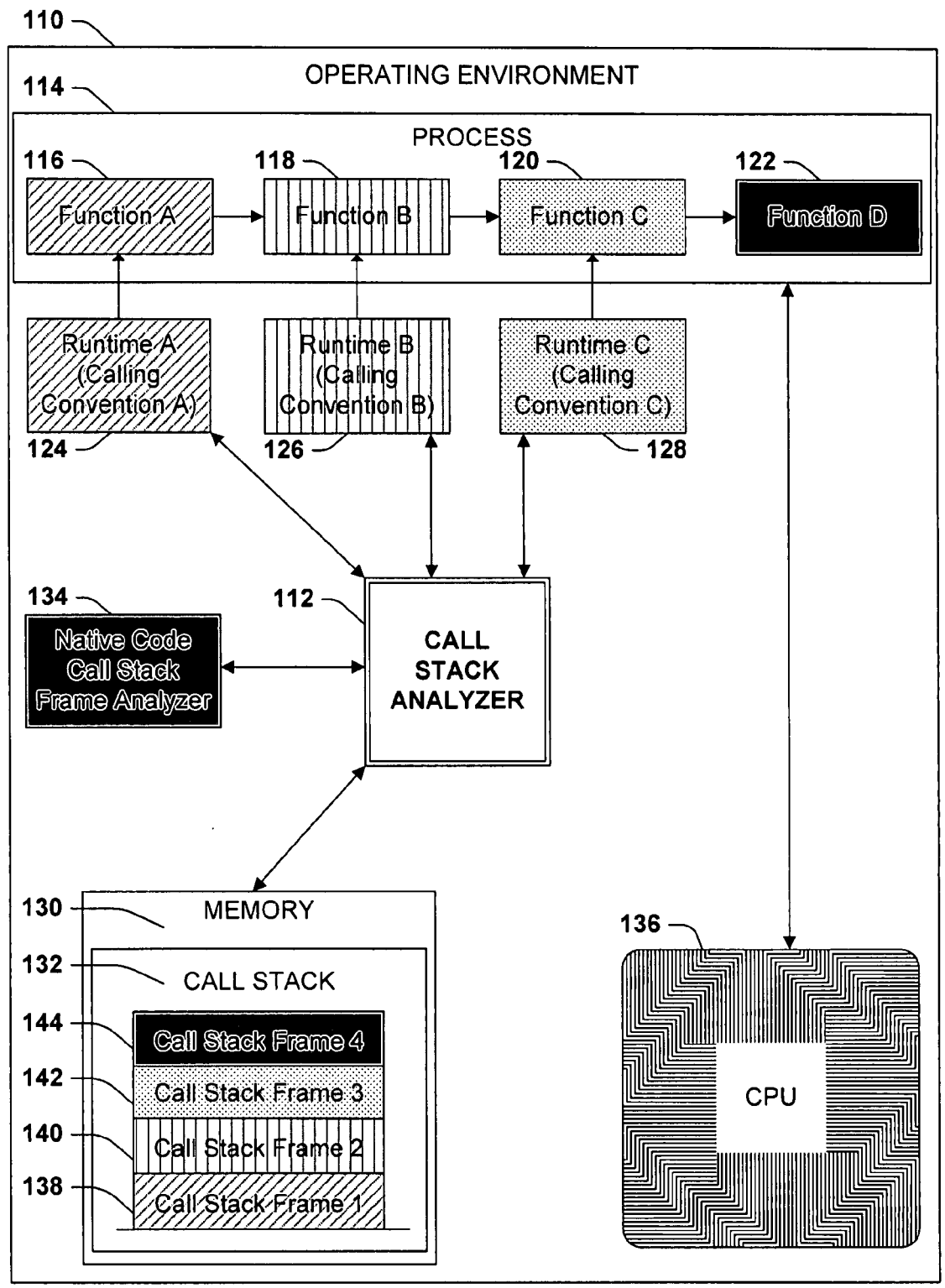
FIG. 3 is a system component diagram illustrating an exemplary system for analyzing a call stack.

FIG. 3 illustrates another embodiment of this technique as a system for analyzing a call stack. This exemplary system operates within an operating environment 110 that comprises a process 114 containing at least one function (this illustrated operating environment 110 comprises four functions 116, 118, 120, and 122), at least one runtime (this illustrated operating environment 110 comprises three runtimes 124, 126, and 128), a memory 130 that contains the call stack 132 for the process 114, and a native code call stack frame analyzer 134. The operating environment 110 likely also includes at least one processor (such as a CPU) 136 configured to execute the instructions comprising processes such as the process 114. Each of the four functions 116, 118, 120, 122 comprises a different kind of code, and utilizes a different kind of calling convention. Function A 116, the top-level function in this process 114 (e.g., the Main( ) function where the process execution initiates), is managed by Runtime A 124, which utilizes calling convention A. Moreover, the invocation of Function A 116 has caused Runtime A 124 to place a first call stack frame 138 on the call stack 132, in accordance with calling convention A. Function A 116 has invoked Function B 118, which is managed by Runtime B 126 that utilizes calling convention B, and that has created a second call stack frame 140 on the call stack 132 in accordance with calling convention B. In turn, Function B 118 has invoked Function C 120, which is managed by Runtime C 128 that utilizes calling convention C, and that has created a third call stack frame 142 on the call stack 132 in accordance with calling convention C. Finally, Function C 120 has invoked Function D 122, a native code module that is not managed by a runtime, which has caused the operating environment 110 to create a fourth (top) call stack frame 144 on the call stack 132 in accordance with a native code calling convention. It will be noted that this illustrated example utilizes various shading types to correlate functions with corresponding runtimes (or solid shading for native code), and also with respective call stack frames on the call stack 132 that were created upon invocation of the functions.

Within the exemplary operating environment 110 of FIG. 3, a call stack analyzer 112 may be introduced and configured to cooperate with the various components of the operating environment 110 for performing a call stack analysis. The call stack analyzer 112 is configured to analyze the call stack 132 in the memory 130 by requesting each of the runtimes 124, 126, 128 to claim the call stack frame 144 that currently occupies the top of the call stack 132. Upon any of the runtimes 124, 126, 128 claiming the top call stack frame 144 of the call stack 132, the call stack analyzer 112 is configured to analyze the top call stack frame 144 with the claiming runtime. On the other hand, upon all of the runtimes 124, 126, 128 declining to claim the top call stack frame 144 of the call stack 132, the call stack analyzer 112 is configured to analyze the top call stack frame 144 with the native code call stack frame analyzer 134 (which is configured to presume that a call stack frame is structured according to the native code calling convention.) In this manner, the call stack analyzer 112 provides an analysis of the top (first) call stack frame 144 on the call stack 132, despite the absence of sufficient information in the call stack 132 to indicate the calling convention by which the top call stack frame 144 was created, or even the size of the top call stack frame 144.

Another embodiment of this technique may apply the analysis of the call stack to more than one call stack frame of the call stack. As noted previously, while the stack pointer may indicate the memory address at the top of the call stack, it may be difficult to determine the size of the call stack frame on top of the call stack without knowing the calling convention that was used to create the top call stack frame. However, the method of FIG. 2 and/or the call stack analyzer system previously described for FIG. 3 may be used to determine the runtime that created the top call stack frame (or whether the top call stack frame was created according to native code calling conventions.) Once the calling convention is identified, the size of the top call stack frame may also be identified. Pointer arithmetic may be applied to identify the top of the second call stack frame—i.e., the top of the call stack frame that was created for the invocation of the function that invoked the lowest-level function, and for which the top call stack frame was created. (The analysis of the top call stack frame may optionally remove the first call stack frame from the call stack, or may simply relocate the stack pointer to the top of the preceding call stack frame.) The call stack analysis technique described previously may again be invoked to analyze the second call stack frame, and so on. Accordingly, several call stack frames may be analyzed by applying this technique repeatedly for successive call stack frames; and the entire call stack may be analyzed in this manner by applying this technique for each call stack frame in the call stack, until the bottom of the call stack is reached.

An exemplary use of the repeated application of these techniques to analyze the entire call stack may be illustrated with reference again to FIG. 3. As noted in the preceding discussion, the call stack analyzer 112 may request the runtimes 124, 126, 128 to claim the call stack frame 144 on top of the call stack 132. In this illustration, the top call stack frame 144 was created by Function D 122, which comprises native code; therefore, the runtimes 124, 126, 128 decline to claim the top call stack frame 144, and the call stack analyzer 112 analyzes the top call stack frame 144 with the native code call stack frame analyzer 134. The call stack analyzer 112 may also ascertain the memory location of the preceding call stack frame 142. For example, the call stack analyzer 112 may use the information gleaned by the native code call stack frame analyzer 134 to determine the logical size of the top call stack frame 144, or may retrieve the memory address of the preceding call stack frame 134 from within the current (top) call stack frame 144. Therefore, upon completion of the analysis of the top call stack frame 144 with the native code call stack frame analyzer 134, the call stack analyzer 112 may then request the runtimes 124, 126, 128 to claim the third call stack frame 142. The third call stack frame 142 is claimed by Runtime C 128, which created the third call stack frame 142 upon invocation of Function C 120; accordingly, the call stack analyzer 112 utilizes Runtime C 128 to analyze the third call stack frame 142. Again, the call stack analyzer 112 may then use the determined size of the third call stack frame 142 and pointer arithmetic to identify the top of the second call stack frame 140, which is claimed by Runtime B 126 that created the second call stack frame 140 upon invocation of Function B 118. Finally, the call stack analyzer 112 may then use the determined size of the second call stack frame 140 and pointer arithmetic to identify the top of the first call stack frame 138, which is claimed by Runtime A 124 that created the first call stack frame 138 upon invocation of Function A 116. Based on the size of the first call stack 138 and pointer arithmetic, the call stack analyzer 112 calculates that the stack pointer has reached the bottom of the call stack 132, indicating that the call stack analysis is complete.

Figure 4:
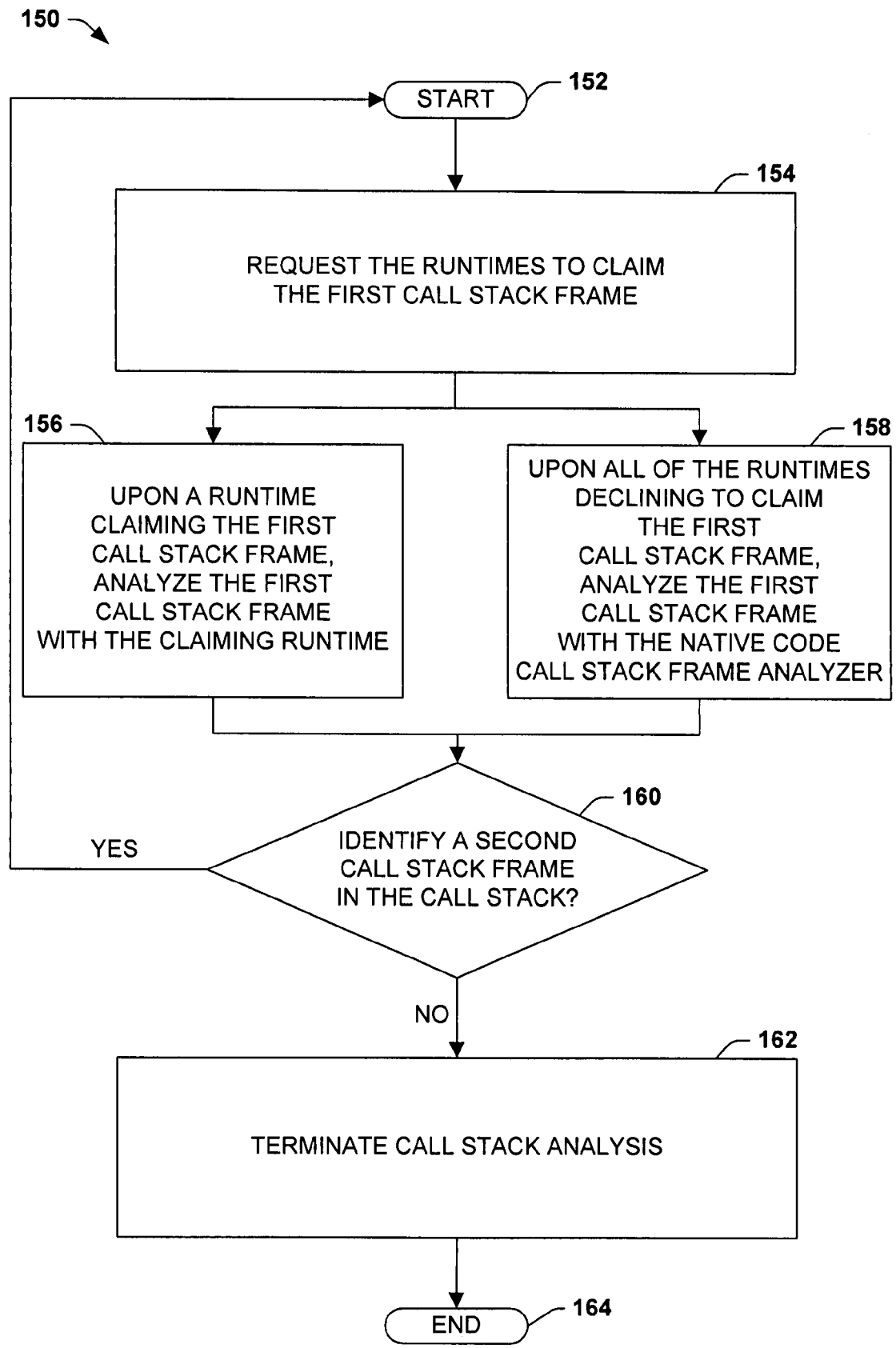
FIG. 4 is a flowchart illustrating another exemplary method of analyzing a call stack.

The preceding example illustrates the extension of the call stack analysis technique to analyze successive call stack frames, thereby permitting analysis of a portion or the entirety of the call stack. This extended technique is more fully illustrated in the flowchart of FIG. 4, which presents another method of analyzing a call stack available to at least one runtime and comprising a first call stack frame. In FIG. 4, the method 150 begins at 152 and (once again) involves requesting the at least one runtime to claim the first call stack frame 154. Upon a runtime claiming the first call stack frame, the method 150 involves analyzing the first call stack frame with the claiming runtime 156; while upon all of the runtimes declining to claim the first call stack frame, the method 150 involves analyzing the first call stack frame with a native code call stack frame analyzer 158. After analyzing the first call stack frame with one of a claiming runtime 156 or an unmanaged code call stack frame analyzer 158, the method 150 next attempts to identify a second call stack frame 160. If at 160 a second call stack frame is identified, the method 150 continues at the start 152 of the method 150 and analyzes the second call stack frame, etc. (It will be appreciated that upon returning to the start 152 of the method 150, the second call stack frame has become the "first" calls stack frame during the second pass through the method 150, etc.) However, if at 160 a second call stack frame is not identified, the call stack analysis is terminated 162 and the method 160 ends at 164. Having analyzed successive call stack frames until no further call stack frames may be identified, the method 160 achieves an analysis of the contents of the call stack.

Figure 5A:
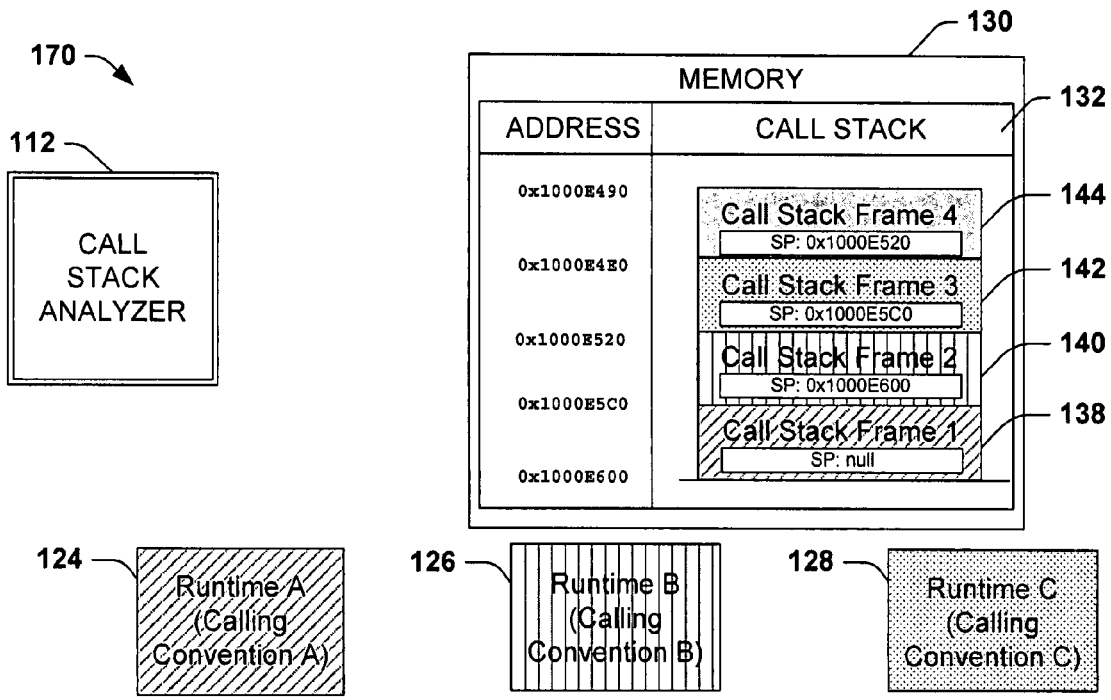
FIG. 5A is a system component diagram illustrating another exemplary system for analyzing a call stack.
Figure 5B:
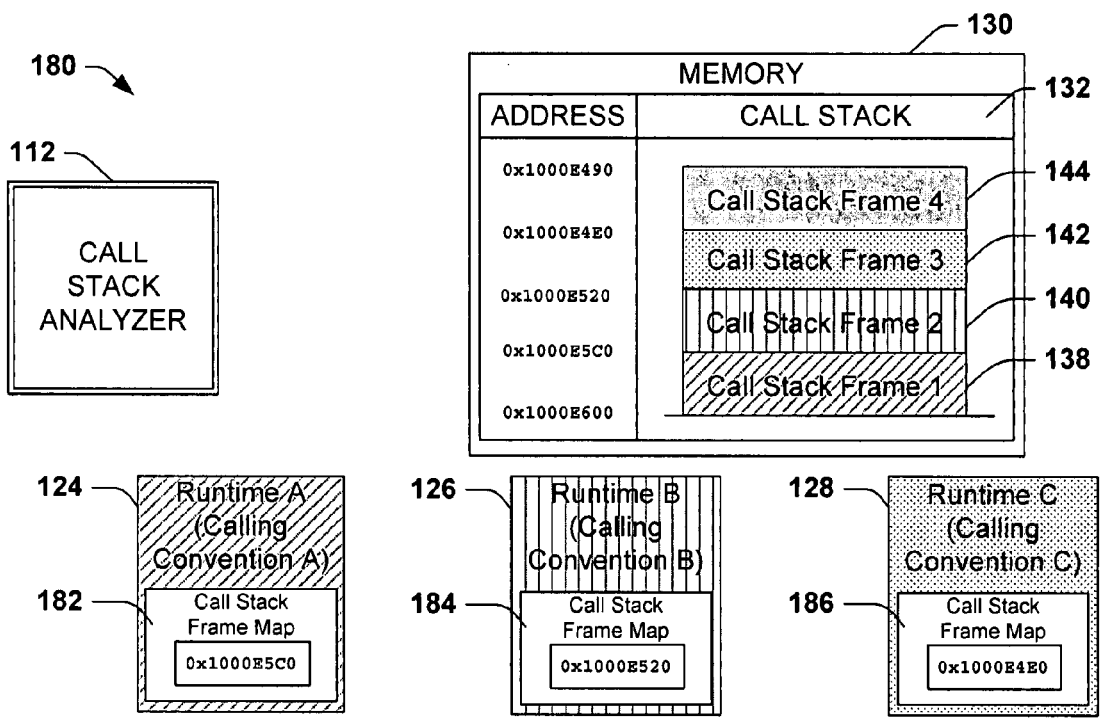
FIG. 5B is a system component diagram illustrating yet another exemplary system for analyzing a call stack.

The techniques discussed may vary in several implementation details that may present various advantages. In one aspect, the techniques may vary in the manner in which a runtime identifies the call stack frames that it has created in order to claim them upon request of the call stack analyzer. A few variations of this aspect are illustrated in FIGS. 5A-5B, each of which illustrates an exemplary system for analyzing a call stack, such as the exemplary system illustrated in FIG. 3. More specifically, the system illustrated in each figure comprises the call stack analyzer 112; a set of three runtimes 124, 126, and 128; and the memory 130 containing the call stack 132. For convenience, these exemplary systems (and those of other figures) are illustrated consistently with the exemplary system of FIG. 3; however, it will be appreciated that the examples are not limited to the exemplary system presented therein, but may be applied to any embodiment of these techniques.

One such variation is illustrated in FIG. 5A, which presents an exemplary system 170 for analyzing a call stack 132, wherein the call stack analyzer 112 requests the runtimes (in this example, Runtimes A 124, B 126, and C 128) to identify a call stack frame in the call stack 132, each of which is located at a particular memory address in the memory containing the call stack 132. For example, the first (top) call stack frame 144 is stored between hexadecimal memory addresses 0x1000E490 and 0x1000E4E0, while the earliest (bottom) call stack frame 138 is stored between hexadecimal memory addresses 0x1000E5C0 and 0x1000E600 (the latter memory address representing the bottom of the call stack 132.) In this exemplary system 170, the call stack frames 138, 140, 142, 144 may include the memory address of the preceding call stack frame. For example, the information stored to represent the processor context may include the stack pointer at the time of the function invocation, which would refer to the call stack frame of the calling function. If the stack pointer is stored in the call stack frame 138, 140, 142, 144, then the call stack analyzer can determine the location of the preceding call stack frame based on the contents of the current call stack frame. For example, the top call stack frame 144 includes a snapshot of the stack pointer at the moment of function invocation, at which time the stack pointer referenced the memory address 0x1000E520 for the preceding call stack frame 142. The call stack analyzer may utilize this information to determine the location of respective call stack frames.

Another variation is illustrated in FIG. 5B, which again illustrates an exemplary system 180 comprising a call stack analyzer 112 that requests Runtimes A 124, B 126, and C 128 to identify a call stack frame in the call stack 132. In this variation, the runtimes 124, 126, 128 may be configured to identify and store the memory addresses of the call stack frames (e.g., the address comprising the "top" of each call stack frame) created by the runtime. These memory addresses are recorded in a call stack frame map 182, 184, 186, which may be updated by each runtime upon creating additional call stack frames or popping existing call stack frames from the call stack 132. The call stack analyzer 112 may then request the runtimes 124, 126, 128 to claim a particular call stack frame (e.g., the second call stack frame 140) occupying a particular memory address in the call stack 132 (e.g., 0x0100E520.) Each runtime 124, 126, 128 may consult its call stack frame map 182, 184, 186 to locate the referenced call stack frame, and the runtime having a call stack frame map that includes the referenced address (e.g., Runtime B 126, referencing its call stack frame map 184) may claim the call stack frame. If the memory address of the referenced call stack frame is not located in the call stack frame map of any runtime, then the call stack analyzer 112 may presume that the call stack frame was created by native code, and may utilize the native code call stack frame analyzer to analyze the call stack frame. This variation 180 may present the advantage of requiring no cooperation between the various runtimes in tracking the call stack, and no metadata associated with the call stack or the call stack frames; each runtime simply keeps track of its own set of information. However, it will be appreciated that those having ordinary skill in the art may devise a number of variations in runtime identification and claiming of call stack frames that utilize the techniques described herein.

A second aspect of these techniques that may be differently reflected in various implementations relates to the state of the process associated with the call stack. The techniques described herein may be directed toward the analysis of a call stack for a process that is halted, e.g. for a process that has been suspended due to the raising of an unhandled exception. These techniques may also be directed, e.g., toward the analysis of a call stack for a memory snapshot of a process, such as a core dump that reflects the state of a process (including the contents of the call stack) during a critical event. However, these techniques may also be directed toward the analysis of the call stack of a running process, which may be more difficult, as the rate of function invocation and completion is often very rapid, and the call stack may be rapidly changing. This analysis may be additionally complicated in a multiprocessor and/or multicore computing environment, where the process may have an affinity for a particular processor or core, such that it may be difficult to find a moment when the process is not running.

Figure 6A:
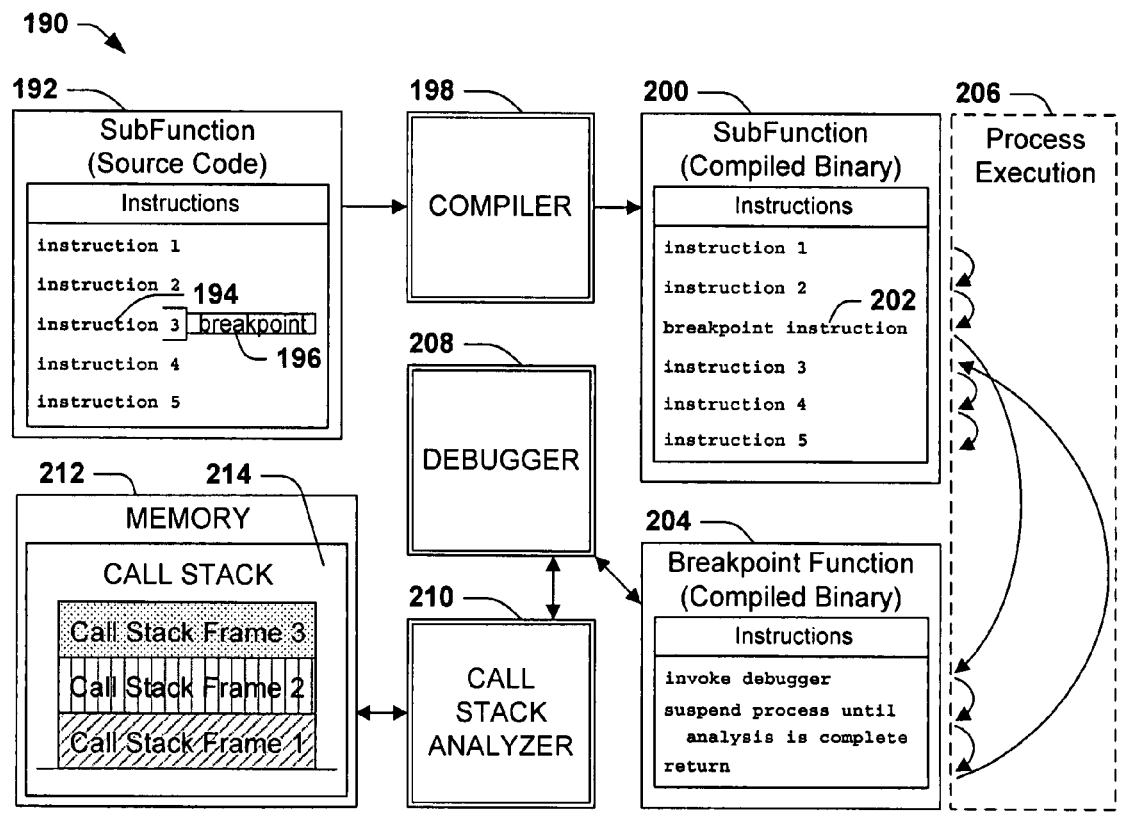
FIG. 6A is a system component diagram illustrating yet another exemplary system for analyzing a call stack.
Figure 6B:
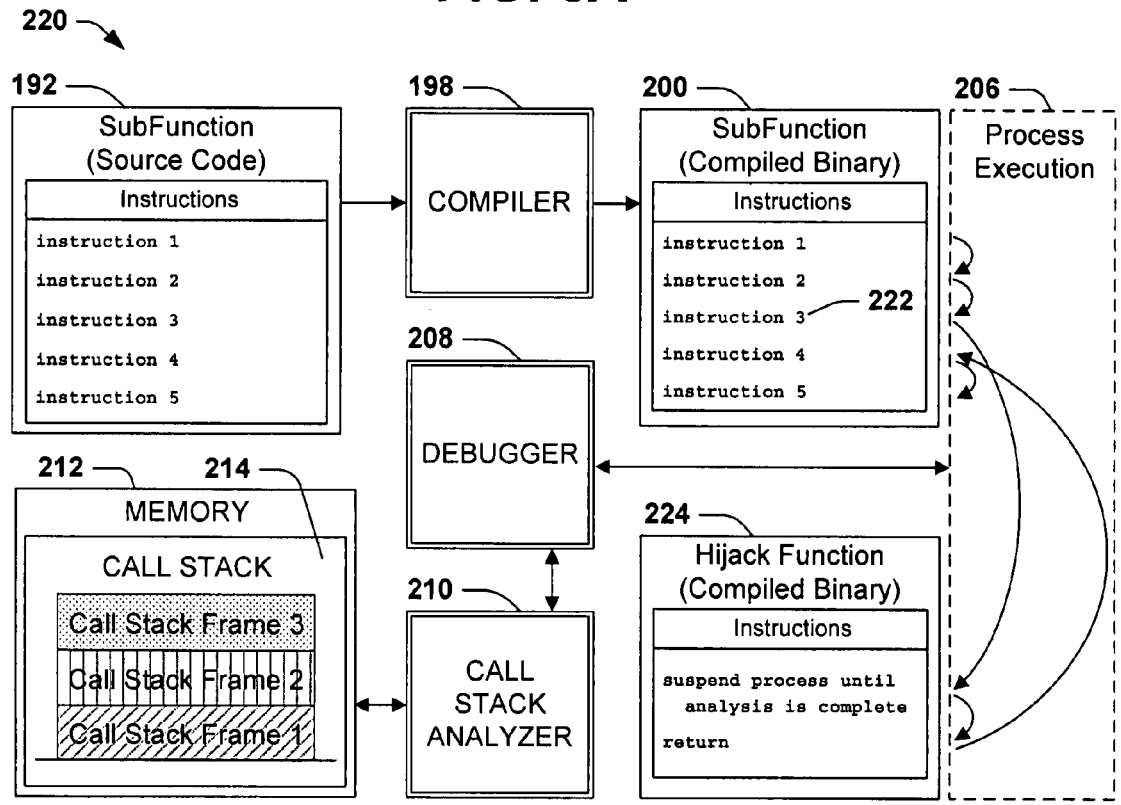
FIG. 6B is a system component diagram illustrating yet another exemplary system for analyzing a call stack.

Instead, an executing process (including all of the threads contained therein) that is to be subjected to call stack analysis may be suspended. FIG. 6A and FIG. 6B illustrate two techniques for suspending a process, and a process suspended by either of these techniques (or any other applicable technique) may be the subject of the call stack analysis techniques discussed herein.

FIG. 6A illustrates an exemplary system for analyzing a call stack, such as the system of FIG. 3, that is configured to suspend the process by introducing a breakpoint. A programmer may insert a breakpoint into the source code of the process to request suspension of execution upon reaching the location of the breakpoint in the source code. This suspension may be enacted by having the compiler insert a breakpoint instruction in that location that instructs the process to suspend execution. The breakpoint instruction may take further actions, such as notifying the operating environment or invoking a debugger for the suspended process. In the exemplary system 190 illustrated in FIG. 6A, the source code 192 for a function called "SubFunction" 192 comprises a set of instructions, including an instruction 194 that has been flagged by a breakpoint 196. When the source code 192 is compiled (e.g., by a compiler 198) into a compiled binary 200, a breakpoint instruction 202 is inserted before the instruction 194 flagged with the breakpoint 196. The breakpoint instruction 202 operates to suspend the process, such as by invoking a breakpoint function 204, which may perform tasks such as invoking a debugger and suspending the process. A process may subsequently invoke the compiled binary 200, resulting in a process execution 206 (illustrated in FIGS. 6A-6B as a set of arrows indicating the order in which the functions of the compiled binary 200 are executed.) When the process invokes the "SubFunction" function in the compiled binary 200, the process execution 206 begins at the first instruction of the function, and upon reaching the breakpoint instruction 202, the process execution 206 diverts to the breakpoint function 204 that suspends the process execution 206 in preparation for call stack analysis. In this exemplary system 190 for analyzing a call stack, the breakpoint function 204 also invokes the debugger 208 before suspending the process execution 206; the debugger 208 in turn invokes the call stack analyzer 210 that analyzes the call stack 214 stored in memory 212. Upon completion of the call stack analysis, the debugger 208 may resume the process execution 206, which completes the invoked breakpoint function 204 and returns the process execution 206 to the instruction following the breakpoint instruction 202 (i.e., the instruction 194 on which the breakpoint 196 was placed in the source code 192.) In this manner, the call stack analysis techniques described herein may be applied to a process.

The insertion of a breakpoint may be helpful for predetermined debugging of a process, where the programmer selects a location in the source code where the process execution is to be suspended. However, this technique may be less easily applied for debugging a running process, especially if the programmer is unable to determine which portion of the code the process is executing (and this is the type of scenario in which a call stack analysis may be particularly helpful.) An alternative technique for suspending a process for call stack analysis involves process hijacking, in which the process is diverted and compelled to invoke a process suspension, e.g., by forcing the memory address of a breakpoint function into the instruction pointer for the process. FIG. 6B presents an example of this technique by illustrating another exemplary system 220 for analyzing a call stack, such as the exemplary system of FIG. 3, as applied to a process hijacked in this manner. This illustration comprises the function called "SubFunction" 192 that again comprises a set of instructions, but no breakpoint has been applied to the instructions. The compiler 198 therefore generates the compiled binary 200 for the function without including a breakpoint instruction, and the process ordinarily executes the compiled binary 200 without interruption. This exemplary system 220 also includes a debugger 208, but rather than awaiting invocation from a breakpoint function, the debugger acts upon command (e.g., from the programmer) to interact directly with the process execution 206. In this exemplary system 220, the debugger 208 forces the address of a hijack function 224 into the instruction pointer of the process, which diverts the process execution 206 to the hijack function 224 that, in turn, suspends the process execution 206. The debugger 208 then invokes the call stack analyzer 210 that analyzes the call stack 214 stored in memory 212. Upon completion of the call stack analysis, the debugger 208 resumes the process execution 206, which completes the hijack function 224 and returns the process execution 206 to the instruction 222 to be next executed in the compiled binary 200.

The process hijack technique illustrated in FIG. 6B may be helpful for suspending a process at will. However, call stack analysis of a process suspended in this manner may be more difficult, because some information that might be helpful to the call stack analysis is lost in the process. For example, the identity of the function invoked at the moment of suspension is no longer known, because the contents of the instruction pointer were overwritten with the memory address of the breakpoint function. Some call stack analysis techniques may be hampered by this lack of information. For example, a call stack analyzer may be unable to determine the type of code that the process had been executing at the moment of suspension, and so unable to determine the calling conventions by which the call stack frames were created. However, the techniques discussed herein may be more readily compatible with a hijacked process, and may facilitate the analysis of the call stack regardless of the incomplete information as to the function under execution at the moment of hijacking. If the runtimes are configured to store information about each call stack frame created thereby, then the call stack analyzer may be capable of parsing each call stack frame according to the calling convention of the runtime that created it, even if the invoked function for which the call stack frame was generated is not known.

A third aspect that relates to these techniques relates to the allocation of multiple call stack frames for a function, such as for various portions of a function. In most instances, a call stack frame analyzer (either provided in a runtime or in a native code call stack frame analyzer) invoked to analyze the frame may presume a one-to-one relationship between instances of invoked functions and call stack frames. However, in some scenarios, an invoked function may prompt the creation of multiple call stack frames for different sections of the code comprising the function. In one such scenario, the instructions may be grouped into a "parent" set of instructions (the instructions comprising the main portion of the function) and one or more "child" sets of instructions (comprising a smaller group of instructions embedded in the parent function.) One such scenario is the concept of a nested function, wherein one function encapsulates another function, which may be advantageous where the function repeatedly uses a small section of code that is only useful to this function. In this case, the instructions comprising the main body of the function may compiled into a first function that induces the creation of a first ("parent") call stack frame upon execution, and a second function that induces the creation of a second ("child") call stack frame upon execution within the first function.

Another scenario that may result in the creation of multiple call stack frames for a single function relates to "try" and exception handling blocks such as "catch" blocks and "finally" blocks. A "try" block is a portion of code that is suspected of potentially causing an error that interrupts the flow of the application (e.g., throwing an exception.) One example where such an error might arise is in writing data to a file on a storage medium; the writing may fail for any of several reasons (e.g., the medium fails to accept the data, the medium is write-protected, the medium is out of storage space, or the data to be written to the medium is invalid), in which case process execution may be unable to continue. In the event of such an error, it may be desirable to cease execution of the "try" block of code, and instead to execute a block of instructions that are intended to recover from the error (e.g., reporting the failure in writing to the medium to the user, and perhaps displaying some diagnostic information to help the user address the problem.) The latter block of instructions may be presented in a "catch" block that adjacently follows the "try" block, which signals the compiler to create binary code wherein the "catch" block of instructions are to be executed if the "try" block of instructions raise an error to be handled. Moreover, other types of exception handling blocks exist that may alter the flow of execution. One example is a "finally" block of instructions that are to be executed upon the completion of the "try" block (i.e., regardless of whether the "try" block causes an exception.) The programmatic flow through these error-handling mechanisms may become even more complicated with the nesting of "try" and "catch" blocks within other "try" and "catch" blocks.

Figure 7:
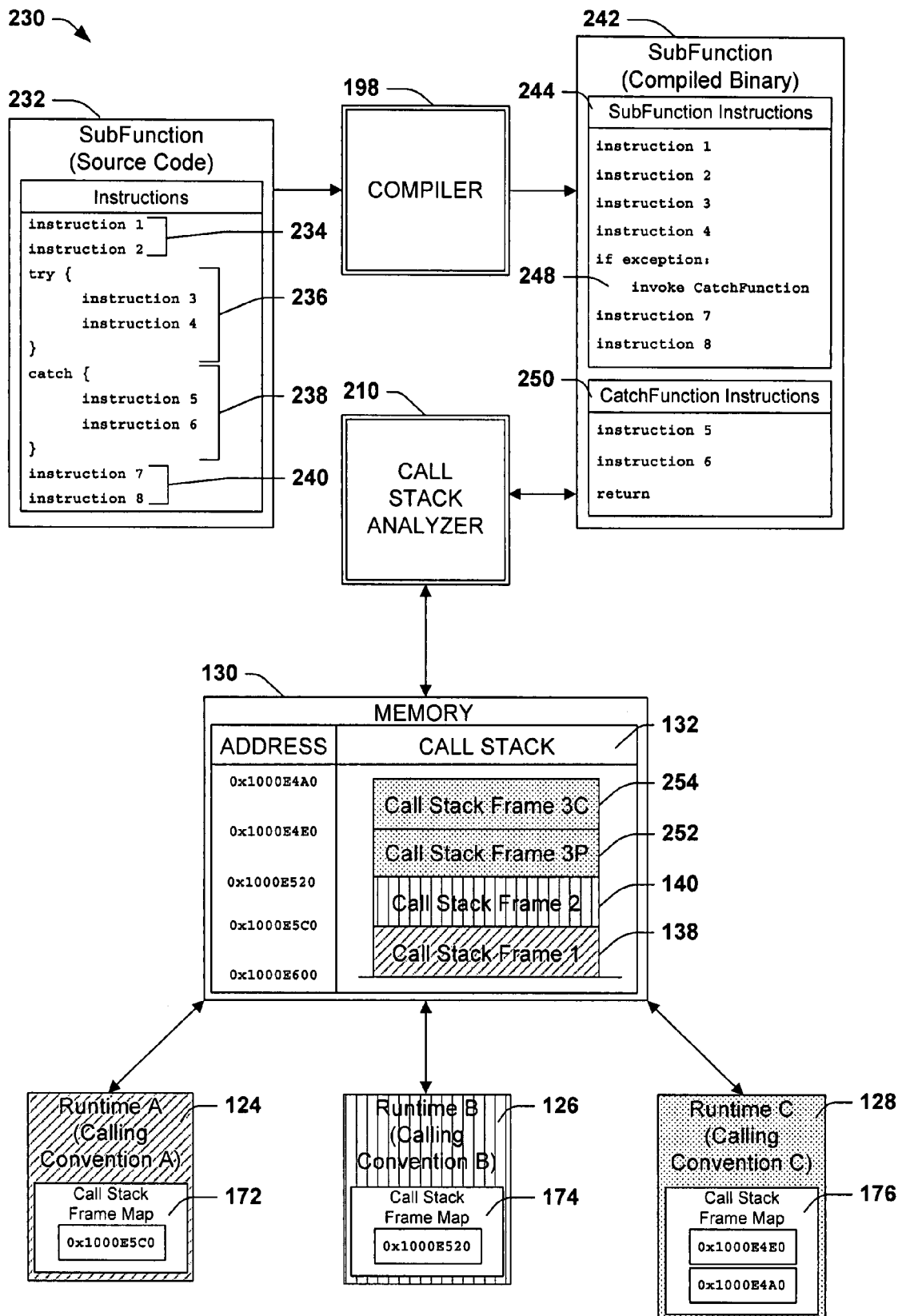
FIG. 7 is a system component diagram illustrating yet another exemplary system for analyzing a call stack.

FIG. 7 presents an exemplary use of "try" and "catch" blocks and the consequences for call stack analysis. FIG. 7 illustrates an exemplary system 230 for analyzing a call stack, such as the exemplary method of FIG. 3, that comprises a function 232 called "SubFunction" that contains a "try" block 236 and an adjacently following "catch" block 238, along with some instructions preceding 234 and following 240 these two code blocks. The source code for the "SubFunction" function 232 is sent to a compiler 198, which is responsible for creating a compiled binary 242 that reflects the "try"/"catch" block semantics. The compiler 198 may choose to implement this semantic by factoring the instructions of the compiled binary 242 into a parent function 244 ("SubFunction") comprising the main block of instruction and the "try" block of instructions, and a child function 250 ("CatchFunction") comprising the "catch" block of instructions. The parent function 244 is compiled with the "catch" block encoded as an invocation of the "CatchFunction" function 250 conditioned on the invoked "try" instructions raising an exception. As in other implementations, a process that executes the compiled binary 242 may utilize a call stack 132 represented in a memory 130 for storing call stack frames created in response to function invocations. Again, as in other implementations, the process may be suspended and subjected to call stack analysis by a call stack analyzer 210, which may request one or more runtimes 124, 126, 128 that are managing the process to claim respective call stack frames on the call stack 132, according to the techniques discussed herein. Moreover, as discussed in FIG. 5A, respective runtimes 124, 126, 128 may comprise a call stack frame map 172, 174, 176 containing the addresses of call stack frames created by the runtime, which may be referenced in determining whether a call stack frame was created by the runtime and is to be claimed upon request of the call stack analyzer 210.

The compilation of the "SubFunction" function 232 into a compiled binary 242 comprising a parent function 244 and a child function 250 may complicate the call stack analysis by adding more than one call stack frame to the call stack 132 for a single invocation of the function 242. A process executing the compiled binary 242 may invoke the parent function 244, beginning with the creation of a parent call stack frame 252 that may be pushed onto the top of the stack over prior call stack frames 140, 138, and then with the execution of the first instructions of the parent function 244. The process may encounter the "try" block resulting in an invocation of the "try" instructions. If the "try" block causes an exception, then the "CatchFunction" function 250 may be invoked, triggering the creation of a child call stack frame 254 pushed onto the call stack 132 over the parent call stack frame 252. It might not be readily apparent from an examination of the source code of the "SubFunction" function 232 that a second call stack frame may be created in addition to the first call stack frame. Moreover, the child call stack frame 254 might not be allocated immediately after the parent call stack frame 252. For example, the exception in the "try" block might have arisen in a function called within the "try" block that has its own call stack frame, and several such call stack frames may exist between the child call stack frame 254 for the invoked "CatchFunction" function 250 and the parent call stack frame 252. If the call stack analyzer 210 were configured to map each call stack frame in the call stack 132 to a function in the source code 232, then the child call stack frame 254 might be unmatchable and even unexpected. As a result, the debugger may not be able to report to the user which function the child call stack frame represents; moreover, the call stack analysis may fail due the inability to utilize pointer arithmetic to determine the location of the call stack frame preceding the unparseable child call stack frame.

However, the techniques presented herein for call stack analysis may circumvent this problem by not relying on a presumed one-to-one correlation between call stack frames and functions. In the embodiment illustrated in FIG. 5A, respective runtimes 124, 126, 128 utilized by these call stack analysis techniques comprise a call stack frame map 172, 174, 176 that holds the memory addresses of the call stack frames created by the runtime. This technique may be configured so as not to differentiate between a parent call stack frame for a function and a child call stack frame for the same function; rather, to the runtime, both invocations simply appear as a function invocation necessitating the creation of a call stack frame. Accordingly, each runtime 124, 126, 128 stores in its call stack frame map 172, 174, 176 the memory addresses of both parent call stack frames and child call stack frames. Similarly, the call stack analyzer 210 does not presume that each call stack frame is exclusively associated with a function in the source code, but simply requests the runtimes 124, 126, 128 to claim a particular call stack frame in the call stack 132, regardless of the "parent" or "child" status of the call stack frame, and regardless of any call stack frames that may exist between the parent call stack frame 252 and the child call stack frame 254. This advantage is illustrated in FIG. 7, wherein the compiled binary 242 including the compiled "SubFunction" function is managed by Runtime C 128 for a process that has been suspended within the "catch" block, and where the call stack 132 contains both a parent call stack frame 252 for the "SubFunction" function 244 and a child call stack frame 254 for the "CatchFunction" function 250. It will be appreciated that both the parent call stack frame 252 and the child call stack frame 254 are represented on the call stack 132, and that the managing Runtime C 128 includes the memory addresses of both call stack frames 252, 254 in its call stack frame map 176. The same properties of these call stack analysis techniques may be utilized for proper analysis of call stacks for processes having nested functions. Therefore, it will be apparent that the call stack analysis techniques described herein are broadly capable of parsing a call stack frame associated with one of an invoked function (e.g., a call stack frame representing an entire function) and a portion of an invoked function (e.g., a parent call stack frame, a child call stack frame, or a nested function call stack frame.)

A fourth aspect of these techniques relates to the operation of the runtimes and the native code call stack frame analyzer with the call stack while analyzing a call stack frame. Various debuggers may operate according to various and different expectations of how the call stack frame analysis is to proceed, and in particular with how the runtimes may leave the state of the call stack upon completion of a call stack frame analysis. Similarly, the runtimes configured to perform call stack frame analyses might operate according to similarly various conventions. The call stack analysis may proceed more accurately if the runtimes and the debugger operate on the same expectations of the debugging process.

One example of varying debugging conventions is where various components conclude the call stack frame analysis by specifying the memory address within respective stack frames of the specified data set. The stack pointer of the call stack may be used for this purpose, such that the runtimes and the native code call stack frame analyzer are configured to conclude the analysis of a call stack frame by setting the stack pointer to the specified data set within the call stack frame. Accordingly, the runtimes and the native code call stack frame analyzer utilized in these techniques may be configured to set the stack pointer relative to the data comprising the first call stack frame. More specifically, the setting may comprise setting the stack pointer to one of the call stack address of the return address of the first call stack frame and the call stack address of the parameters of the first call stack frame.

Figure 8A:
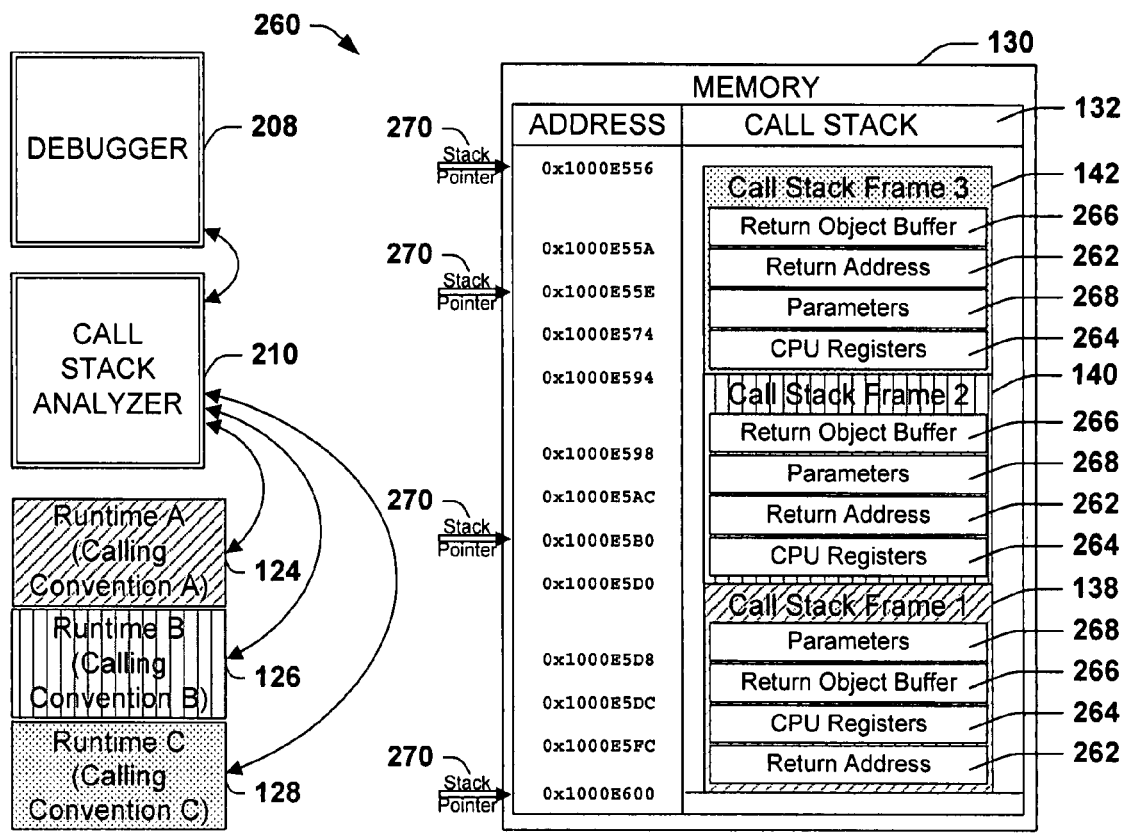
FIG. 8A is a system component diagram illustrating yet another exemplary system for analyzing a call stack.
Figure 8B:
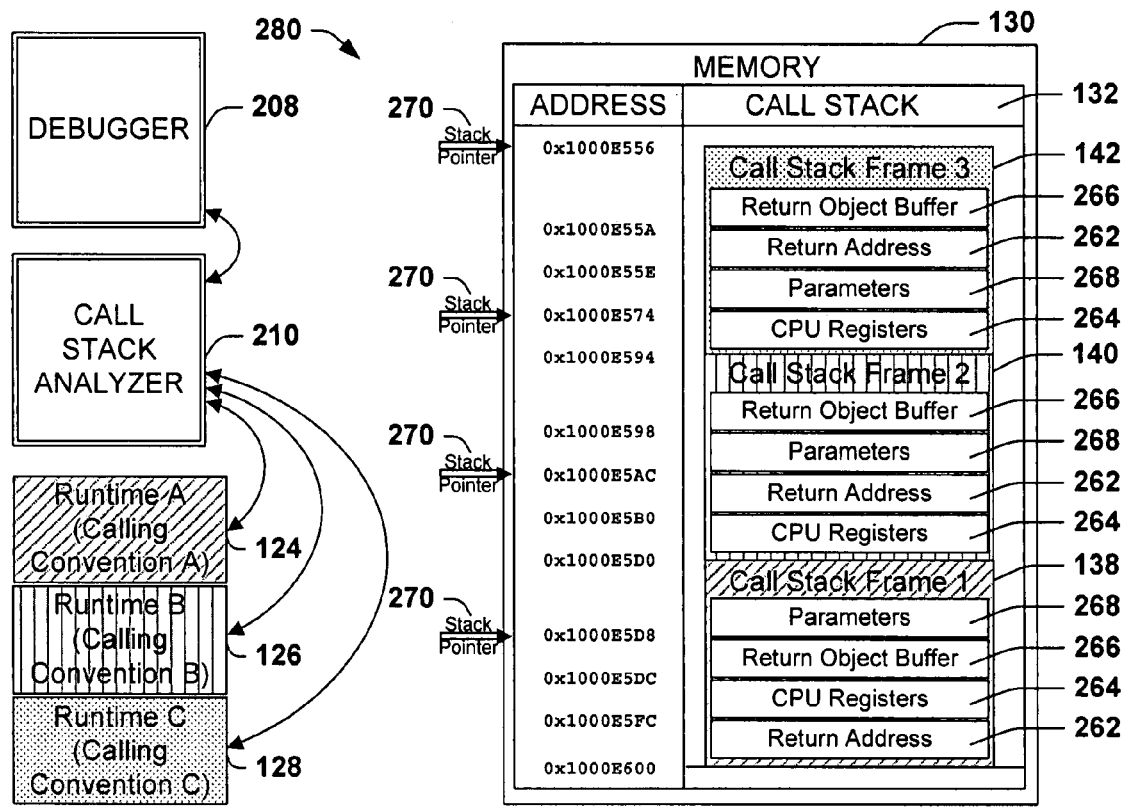
FIG. 8B is a system component diagram illustrating yet another exemplary system for analyzing a call stack.

FIGS. 8A-8B illustrate call stack analysis techniques in which the runtimes and the native code call stack frame analyzer are configured to set the stack pointer relative to the data comprising the first call stack frame. The exemplary system 260 of FIG. 8A and the exemplary system 280 of FIG. 8B each comprise a debugger 208 operably coupled with a call stack analyzer 210 configured to analyze a call stack 132 stored in a memory 130 by utilizing runtimes 124, 126, 128 and a native code call stack frame analyzer (not shown.) In each figure, the call stack 132 comprises three call stack frames 138, 140, 142 created and placed on the call stack 132 by the runtimes (124, 126, and 128, respectively.) Each call stack frame 138, 140, 142 in these exemplary systems 260, 280 comprises the same pieces of information: a return address 262 (except for the bottom-most call stack frame representing the topmost function, which may omit a return address), the state of a set of CPU registers 264, the address of the return object buffer 266, and the parameters 268 provided to the invoked function. However, the data is stored in a different format and order in each call stack frame 138, 140, 142, due to the varying calling conventions of the runtimes 124, 126, 128.

In the exemplary system of FIG. 8A, the runtimes are configured to set the stack pointer 270 for the call stack 132 to the return address, i.e., the memory address of the instruction in the invoking function to which process execution will return upon completion of the invoked function. When the call stack analysis begins, the stack pointer 270 points to the top of the call stack. The top call stack frame 142 is claimed by Runtime C 128 according to the techniques provided herein, and upon completion of the call stack frame analysis, Runtime C 128 sets the stack pointer 270 to the call stack address (0x1000E55E) within the third call stack frame 142 for the return address 262. The second call stack frame 140 is next analyzed, and is claimed by Runtime B 126, which completes its analysis of the call stack frame 140 by setting the stack pointer 270 to the call stack address (0x1000E5B0) within the second call stack frame 140 for the return address 262. Next, the first call stack frame 138 is analyzed, and is claimed by Runtime A 124, which completes its analysis of the call stack frame 138 by setting the stack pointer to the call stack address (0x1000E600) within the first call stack frame 138 for the return address 262. Having reached the bottom of the call stack 132, the system 260 terminates the call stack analysis. It may be appreciated that upon the completed analysis of each call stack frame, the stack pointer has been set to the return address of the invoking function, which the debugger 208 may present to the programmer.

The exemplary system 280 of FIG. 8B illustrates a similar embodiment in which the runtimes 124, 126, 128 and the native code call stack frame analyzer (not shown) are configured, upon completing analysis of a call stack frame, to set the stack pointer to the call stack address of the parameters provided by the invoking function to the invoked function. Again, the call stack analysis begins with the stack pointer 270 pointing to the top of the call stack 132. The top call stack frame 138 is again claimed and analyzed by Runtime C 128, but in this exemplary system 280, Runtime C 128 concludes its analysis by setting the stack pointer to the call stack address (0x1000E574) of the parameters 268 stored in the third call stack frame 142. The second call stack frame 140 is claimed and analyzed by Runtime B 126, which completes its analysis and sets the stack pointer 270 to the call stack address (0x1000E5AC) of the parameters 268 stored in the second call stack frame 140. Finally, the first call stack frame 138 is claimed and analyzed by Runtime A 124, which, upon completing its analysis, sets the stack pointer 270 to the call stack address (0x1000E5D8) of the parameters 268 stored in the first call stack frame 138. Having reached the bottom of the call stack 132, the system 260 terminates the call stack analysis. Again, it may be appreciated that this call stack analysis provides access to the parameters 268 for each call stack frame 138, 140, 142, which the debugger 208 may report to the programmer or otherwise utilize.

A fifth aspect of these techniques relates to recovery from a failure in the call stack analysis. The analysis of a call stack may fail for several reasons; e.g., the call stack may be have corrupted with data not representative of call stack frames; the call stack may have been reformatted or reallocated in ways that do not comport with the expectations of the runtimes; a failure in pointer arithmetic (e.g., attempting to locate or access a call stack frame in a memory location past the bottom of the call stack); or access to the memory containing the call stack may be withheld or withdrawn by the operating environment. If the call stack analysis fails, the call stack analyzer may choose simply to terminate the call stack analysis and to report the failure to the programmer.

Alternatively, the call stack analyzer may attempt to recover from a failure by invoking a recovery function, which may attempt, e.g., to rehabilitate or rebuild the call stack or to continue the analysis at a different location in the call stack. The recovery function to be invoked in the event of a failure in the call stack analysis may be specified in many ways. As one example, a general-purpose recovery function may be included in the call stack analyzer, to be invoked in the event of any call stack analysis failure. As another example, a recovery function may be provided in one or more of the runtimes, which may be invoked in the event of an analysis failure for a call stack managed by the runtime. As a third example, the call stack may specify the memory address of a recovery function, and the call stack analyzer may invoke the recovery function in the event of an analysis failure further down the call stack, i.e., upon failure to analyze a call stack frame beneath the call stack frame specifying the recovery function. Such recovery functions may be specified in the call stack within various call stack frames, or may be stored on the call stack in other data structures, and may effectively partition the call stack into various regions, each region serviced by a specific recovery function. In the event that a plurality of recovery functions are specified, the call stack analyzer may choose to invoke any of the recovery functions, and may even choose to invoke several or all of the recovery functions simultaneously or in series. Where multiple recovery functions are specified, it may be advantageous to select and invoke the recovery function located on the call stack before the point of failure (i.e., logically below in an upward-growing call stack, and logically above in a downward-growing call stack) and closest to the point of analysis failure among such call stack frames. This choice may limit the scope of the recovery process to the smallest portion of the call stack, thereby avoiding unnecessary analysis of and tampering with unrelated portions of the call stack.

Figure 9:
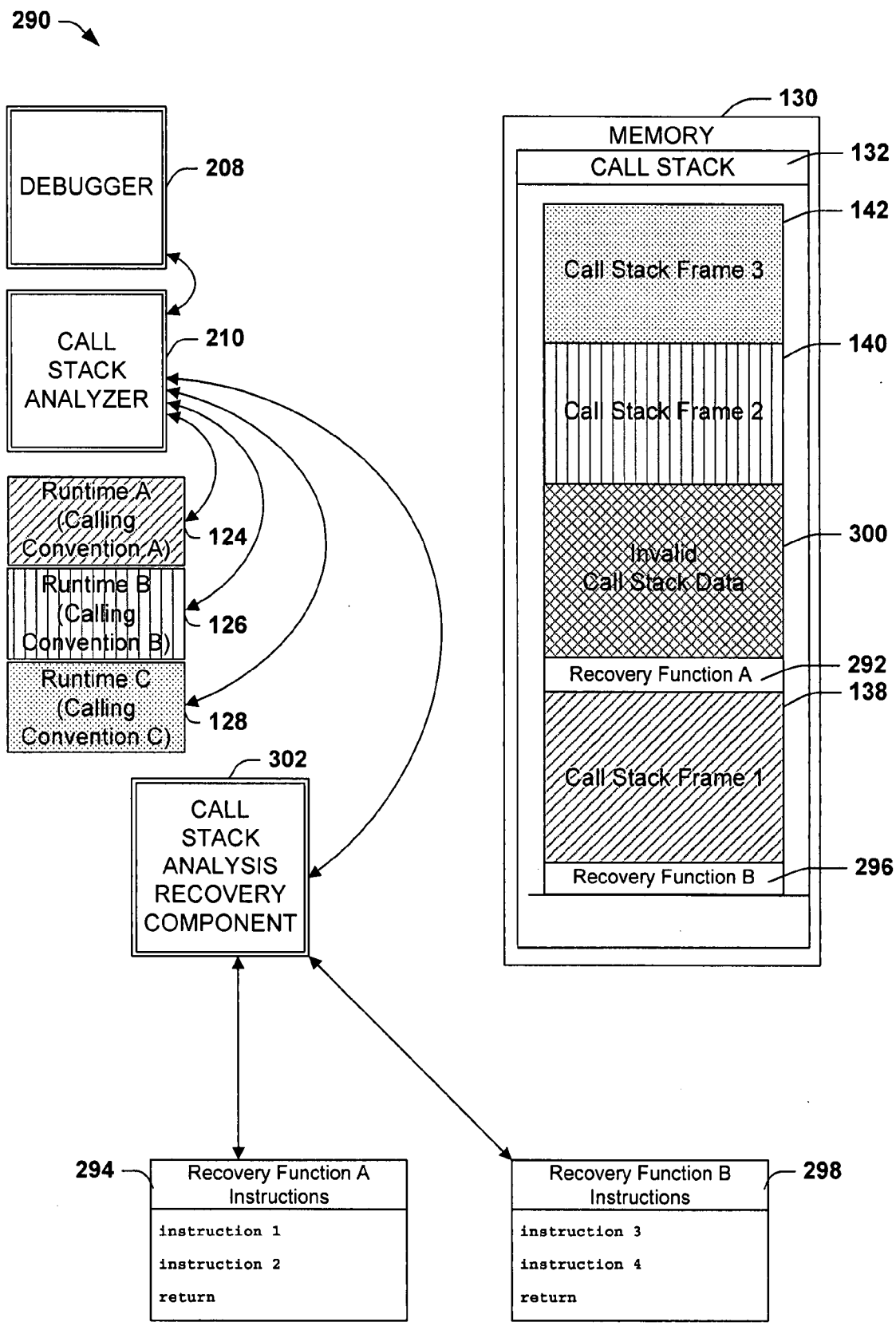
FIG. 9 is a system component diagram illustrating yet another exemplary system for analyzing a call stack.

FIG. 9 illustrates an exemplary system 290 for analyzing an upward-growing call stack that utilizes recovery functions for recovering from failures in the call stack analysis. As in previous examples, the exemplary system 290 of FIG. 9 features a debugger 208 operably coupled to a call stack analyzer 210 that is configured to analyze a call stack 132 in a memory 130. The call stack 132 again contains call stack frames 138, 140, 142 created by runtimes 124, 126, 128 upon the invocation of functions managed by the runtimes 124, 126, 128. In addition, the call stack 132 specifies two recovery functions 292, 296 that may be invoked upon failure of the call stack analysis. Above the first call stack frame 138 is a recovery function 292 that specifies (e.g., by specifying the memory address) Recovery Function A 294, and below the first call stack frame 142 is a second recovery function 296 specifying Recovery Function B 298.

The exemplary system 290 also illustrates the use of these recovery functions 292, 298 in the event of a call stack analysis failure. In this example, the call stack analysis begins with the claiming and analysis of the third call stack frame 142 by Runtime C 128, followed by the claiming and analysis of the second call stack frame 140 by Runtime B 126. Following the analysis of the first call stack frame 138, the call stack analyzer 210 encounters invalid call stack data 300, which may indicate a corruption of the call stack 132. In this event, the call stack analyzer 210 may invoke a call stack analysis recovery component 302 that is configured to recover from the call stack analysis failure by invoking one of the recovery functions 292, 298 on the call stack 132. The call stack analysis recovery component 302 may note that two recovery functions 292, 298 have been specified, and may choose to invoke either or both of the recovery functions 292, 298. The call stack analysis recovery component 302 might advantageously choose to invoke Recovery Function A 294, as it is located on the call stack before the point of failure and closest to the point of analysis failure among such call stack frames. This selection may therefore limit the scope of the call stack recovery task to the portion of the call stack between the selected recovery function 292 and the invalid call stack data 300, whereas selecting Recovery Function B 298 might unnecessarily include additional portions of the call stack in the recovery analysis.

The techniques described herein may be implemented in many ways, and the variations described herein may be included, individually or in combination, to provide implementations having one or more advantageous aspects. One such combination is presented in FIG. 10 as a flowchart illustration of an exemplary method 310 that combines many of the implementation features described herein. This exemplary method 310 provided an analysis of a call stack that is utilized by a suspended process, which may have been achieved through either a breakpoint, such as in the technique illustrated in FIG. 6A, or a process hijack, such as in the technique illustrated in FIG. 6B. Also, in this method 310, the call stack comprises at least one call stack frame associated with either an invoked function or a portion of an invoked function (e.g., where the function includes a nested function or a try/catch block pair, such as illustrated in FIG. 7.) Also, in this method 310, the call stack is accessible to at least one runtime, and the runtimes comprise a call stack frame map comprising the memory addresses of call stack frames created by the runtime and configured to claim the first call stack frame upon locating the memory address of the first call stack frame in the call stack frame map, such as illustrated in FIG. 5A.

Figure 10:
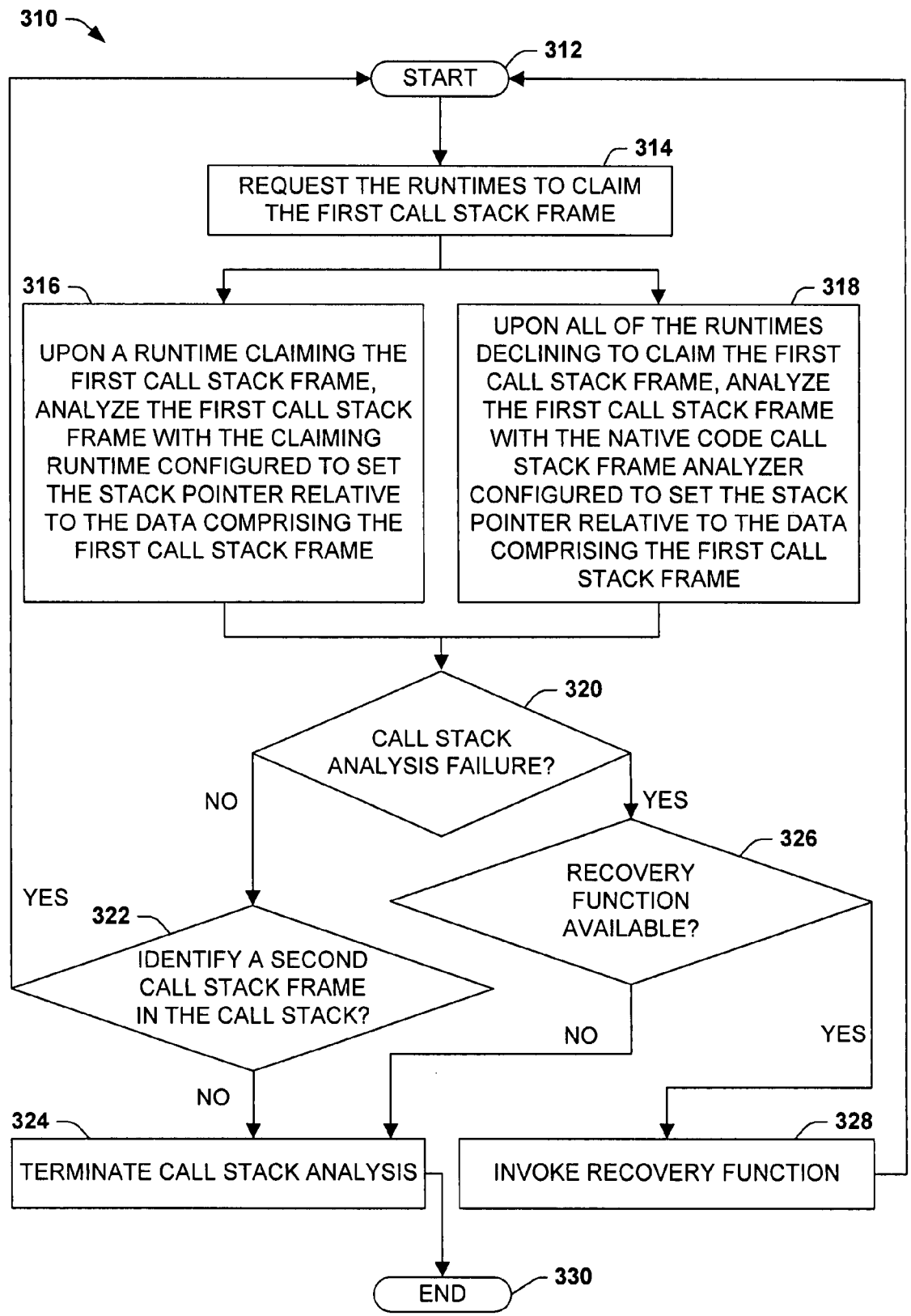
FIG. 10 is a flowchart illustrating yet another exemplary method of analyzing a call stack.

The method 310 of FIG. 10 begins at 312 and involves requesting the at least one runtime to claim the first call stack frame 314. Upon a runtime claiming the first call stack frame, the method 310 involves analyzing the first call stack frame with the claiming runtime 316, whereas upon all of the runtimes declining to claim the first call stack frame, the method 310 involves analyzing the first call stack frame with a native code call stack frame analyzer 318. Moreover, the runtimes utilized in 316 and the native code call stack frame analyzer utilized in 318 are configured to set the stack pointer relative to the data comprising the first call stack frame, such as illustrated in FIG. 8A or FIG. 8B. After analyzing the first call stack frame with a claiming runtime 316 or an unmanaged code call stack frame analyzer 318, the method 310 determines whether the analysis produced a call stack analysis failure 320. If no failure of the call stack analysis is detected at 320, the method 310 next attempts to identify a second call stack frame 322, and either continues at the start 312 of the method 310 if a second call stack frame is identified, or terminates the call stack analysis at 324 if no second call stack frame is identified. (It will be appreciated that upon returning to the start 312 of the method 310, the second call stack frame has become the "first" calls stack frame during the second pass through the method 310, etc.) However, if a call stack analysis failure is detected at 320, the method 310 determines whether a recovery function is available 326, such as illustrated in FIG. 9. If a recovery function is available, the method 310 invokes the recovery function 328, which permits the continuation of the call stack analysis at 312. If no recovery function is available, then the method 310 terminates the call stack analysis 324, upon which the method 310 ends at 330.

Figure 11:
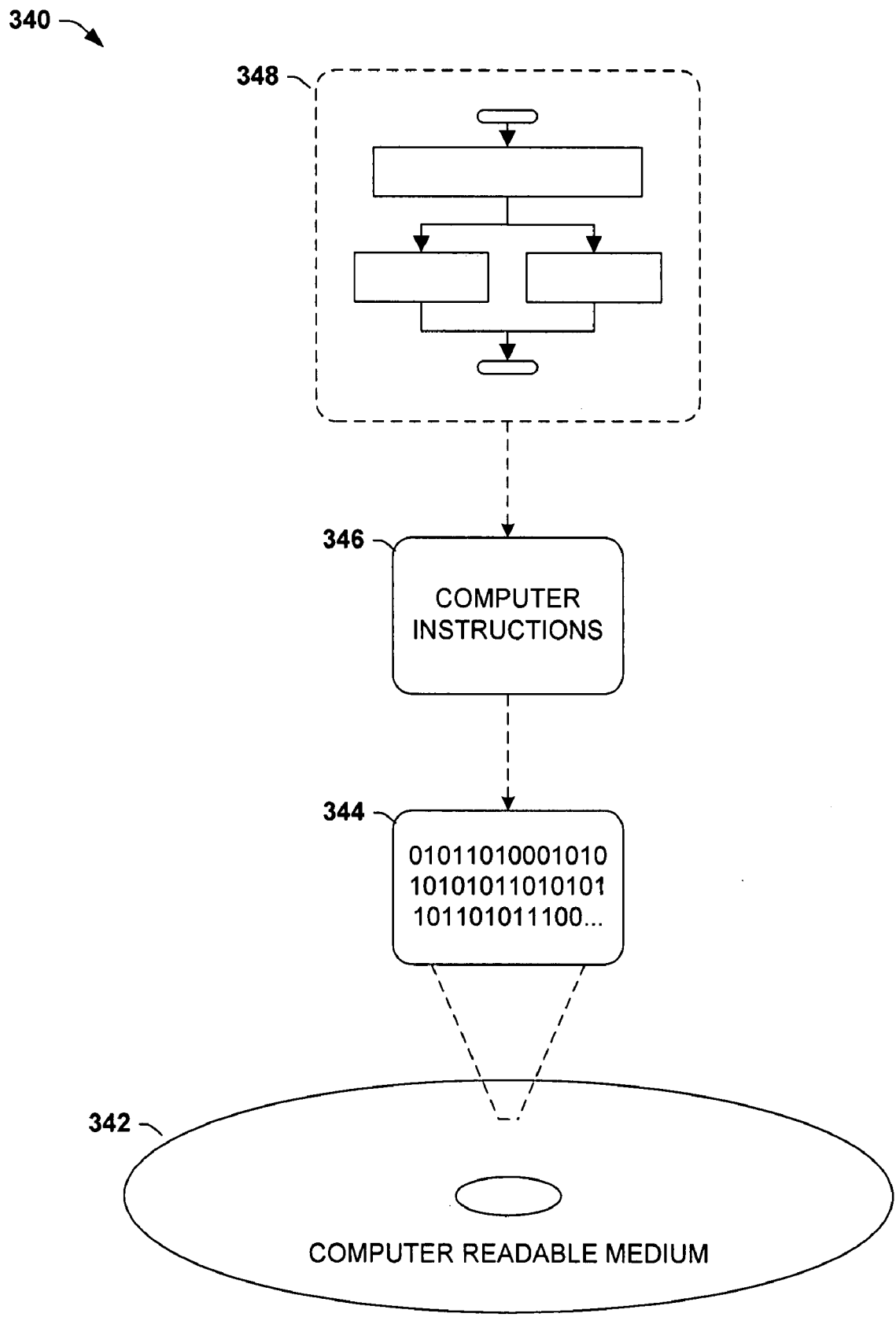
FIG. 11 is an illustration of an exemplary computer-readable medium comprising processor-executable instructions configured to perform a method or implement a system such as disclosed herein.

The techniques discussed herein may also be embodied as a computer-readable medium comprising processor-executable instructions configured to create an aggregated user profile as discussed herein. An exemplary computer-readable medium that may be devised in these ways is illustrated in FIG. 11, wherein the embodiment 340 comprises a computer-readable medium 342 (e.g., a CD-R, DVD-R, or a platter of a hard disk drive), on which is encoded computer-readable data 344. This computer-readable data 344 in turn comprises a set of computer instructions 346 configured to operate according to the principles set forth herein. In one such embodiment, the processor-executable instructions 346 may be configured to perform a method of analyzing a call stack, such as the exemplary methods illustrated in FIG. 2, FIG. 4, and FIG. 10. In another such embodiment, the processor-executable instructions 346 may be configured to implement a system for analyzing a call stack, such as the exemplary systems illustrated in FIG. 3, FIG. 5A, FIG. 5B, FIG. 6A, FIG. 6B, FIG. 7, FIG. 8A, FIG. 8B, or FIG. 9. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of analyzing a call stack available to a runtime and comprising a first call stack frame, respective runtime comprising a call stack frame map identifying memory addresses of call stack frames created by the runtime, and the method comprising:
   requesting the runtime to claim the first call stack frame;
   upon the runtime claiming the first call stack frame by locating the memory address of the first call stack frame in the call stack frame map, analyzing the first call stack frame with the claiming runtime; and
   upon all runtimes declining to claim the first call stack frame, analyzing the first call stack frame with a native code call stack frame analyzer, where the claiming runtime is different from the native code stack frame analyzer.

2. The method of claim 1, comprising:
   after analyzing the first call stack frame, identifying a second call stack frame in the call stack preceding the first call stack frame;
   upon identifying a second call stack frame, analyzing the second call stack frame; and
   upon failing to identify a second call stack frame, terminating the call stack analysis.

3. The method of claim 1, the call stack utilized by a process suspended by one of a breakpoint and a process hijack.

4. The method of claim 3, the process hijack involving setting the instruction pointer of the process to a memory address of a process hijack function.

5. The method of claim 1, the first call stack frame associated with one of an invoked function and a portion of an invoked function.

6. The method of claim 1, the runtimes and the native code call stack frame analyzer configured to set the stack pointer relative to the data comprising the first call stack frame.

7. The method of claim 6, the stack pointer setting comprising setting the stack pointer to one of the call stack address of the return address of the first call stack frame and the call stack address of the parameters of the first call stack frame.

8. The method of claim 1, comprising: upon failing to analyze the first call stack frame, invoking a recovery function specified in at least one call stack frame on the call stack.

9. The method of claim 8, a plurality of recovery functions specified in a plurality of call stack frames, and the invoking comprising invoking the recovery function located on the call stack before the point of failure and closest to the point of analysis failure among such call stack frames.

10. A computer-readable storage device comprising instructions that, when executed on a processor of a computer, implement a call stack analyzer configured to analyze a call stack available to a runtime and comprising a first call stack frame, respective runtime comprising a call stack frame map identifying memory addresses of call stack frames created by the runtime, and the method comprising:
    requesting the runtime to claim the first call stack frame;
    upon the runtime claiming the first call stack frame by locating the memory address of the first call stack frame in the call stack frame map, analyzing the first call stack frame with the claiming runtime; and
upon all runtimes declining to claim the first call stack frame, analyzing the first call stack frame with a native code call stack frame analyzer, where the claiming runtime is different from the native code stack frame analyzer.

11. The computer-readable storage device of claim 10, the call stack analyzer configured to:
    after analyzing the first call stack frame, identify a second call stack frame in the call stack preceding the first call stack frame;
    upon identifying a second call stack frame, analyze the second call stack frame; and
    upon failing to identify a second call stack frame, terminate the call stack analysis.

12. The computer-readable storage device of claim 10, the call stack utilized by a process suspended by one of a breakpoint and a process hijack.

13. The computer-readable storage device of claim 10, the first call stack frame associated with one of an invoked function and a portion of an invoked function.

14. The computer-readable storage device of claim 10, the runtimes and the native code call stack frame analyzer configured to set the stack pointer with respect to the data comprising the first call stack frame.

15. The computer-readable storage device of claim 10, the analyzer configured to recover from a call stack analysis failure by invoking a recovery function specified in a call stack frame on the call stack.

16. The computer-readable storage device of claim 10, the call stack utilized by a process suspended by one of a breakpoint and a process hijack.

17. The computer-readable storage device of claim 10, the process hijack involving setting the instruction pointer of the process to a memory address of a process hijack function.

18. The computer-readable storage device of claim 10:
a plurality of recovery functions specified in a plurality of call stack frames, and
the invoking comprising: invoking the recovery function located on the call stack before the point of failure and closest to the point of analysis failure among such call stack frames.

19. A method of analyzing a call stack utilized by a process suspended by one of a breakpoint and a process hijack, the call stack comprising a first call stack frame associated with one of an invoked function and a portion of an invoked function, and the call stack available to at least one runtime comprising a call stack frame map comprising the memory addresses of call stack frames created by the runtime and configured to claim the first call stack frame upon locating the memory address of the first call stack frame in the call stack frame map, the method comprising:

requesting the at least one runtime to claim the first call stack frame;
upon a runtime claiming the first call stack frame, analyzing the first call stack frame with the claiming runtime, the claiming runtime configured to set the stack pointer relative to the data comprising the first call stack frame;
upon all of the runtimes declining to claim the first call stack frame, analyzing the first call stack frame with a native code call stack frame analyzer configured to set the stack pointer relative to the data comprising the first call stack frame;
identifying a second call stack frame in the call stack preceding the first call stack frame;
upon identifying a second call stack frame, analyzing the second call stack frame;
upon failing to identify a second call stack frame, terminating the call stack analysis; and
upon failing to analyze the first call stack frame, invoking a recovery function specified in at least one call stack frame on the call stack.

* * * * *